United States Patent
Kakde et al.

(10) Patent No.: US 9,536,208 B1
(45) Date of Patent: Jan. 3, 2017

(54) KERNEL PARAMETER SELECTION IN SUPPORT VECTOR DATA DESCRIPTION FOR OUTLIER IDENTIFICATION

(71) Applicant: SAS Institute Inc., Cary, NC (US)

(72) Inventors: Deovrat Vijay Kakde, Cary, NC (US); Arin Chaudhuri, Raleigh, NC (US); Seung Hyun Kong, Cary, NC (US); Maria Jahja, Cary, NC (US); Hansi Jiang, Raleigh, NC (US); Jorge Manuel Gomes da Silva, Durham, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/096,552

(22) Filed: Apr. 12, 2016

Related U.S. Application Data

(60) Provisional application No. 62/293,494, filed on Feb. 10, 2016.

(51) Int. Cl.
  *G06N 99/00* (2010.01)

(52) U.S. Cl.
  CPC .................................. *G06N 99/005* (2013.01)

(58) Field of Classification Search
  None
  See application file for complete search history.

(56) References Cited

U.S. PATENT DOCUMENTS

| | | | | |
|---|---|---|---|---|
| 2011/0242306 | A1* | 10/2011 | Bressler | A61B 3/12 348/78 |
| 2014/0046878 | A1* | 2/2014 | LeComte | G10L 25/51 706/12 |

OTHER PUBLICATIONS

Schleif et al, Prior knowledge for Core Vector Data Description, 2014.*
Yang et al., Anomaly Intrusion Detection Method Based on SVDD, Computer Engineering, vol. 31, No. 3, Feb. 2005.
A. Banerjee, A Support Vector Method for Anomaly Detection in Hyperspectral Imagery, IEEE Transactions on Geoscience and Remote Sensing, vol. 44, No. 8, Aug. 2006, pp. 2282-2291.
Camci et al., Robust kernel distance multivariate control chart using support vector principles, International Journal of Production Research, vol. 46, No. 18, Sep. 15, 2008, pp. 5075-5095.

(Continued)

*Primary Examiner* — Stanley K Hill
*Assistant Examiner* — Mikayla Chubb
(74) *Attorney, Agent, or Firm* — Bell & Manning, LLC

(57) ABSTRACT

A computer-readable medium is configured to determine a support vector data description (SVDD). For each of a plurality of values for a kernel parameter, an optimal value of an objective function defined for an SVDD model using a kernel function, a read plurality of data points, and a respective value for the kernel parameter is computed to define a plurality of sets of support vectors. A plurality of first derivative values are computed for the objective function as a difference between the computed optimal values associated with successive values for the kernel parameter. A plurality of second derivative values are computed for the objective function as a difference between the computed plurality of first derivative values associated with successive values for the kernel parameter. A kernel parameter value is selected where the computed plurality of second derivative values first exceeds zero.

30 Claims, 33 Drawing Sheets

(56) References Cited

OTHER PUBLICATIONS

Kernel Methods for Remote Sensing Data Analysis, ID: 1198661, Description and table of contents, John Wiley and Sons Ltd, Oct. 2009.

Evangelista et al., Some Properties of the Gaussian Kernel for One Class Learning, Proc. Intern. Conference on Artificial Neural Networks, ICANN07, Porto, Portugal, Sep. 2007.

Kang et al., A differentiated one-class classification method with applications to intrusion detection, Expert Systems with Applications 39, 2012, pp. 3899-3905.

Khazai et al., Anomaly Detection in Hyperspectral Images Based on an Adaptive Support Vector Method, IEEE Geoscience and Remote Sensing Letters, vol. 8, No. 4, Jul. 2011, pp. 646-650.

Khediri et al., Kernel k-means clustering based local support vector domain description fault detection of multimodal processes, Expert Systems with Applications 39, 2012, pp. 2166-2171.

Quah et al., Real-time credit card fraud detection using computational intelligence, Expert Systems with Applications 35, 2008, pp. 1721-1732.

Sukchotrat et al., One-class classification-based control charts for multivariate process monitoring, IIE Transactions, vol. 42, Issue 2, Nov. 20, 2009.

Sun et al., A kernel-distance-based multivariate control chart using support vector methods, int. j. prod. res., vol. 41, No. 13, 2003, pp. 2975-2989.

Tax et al., Support Vector Data Description, Machine Learning, 54, 2004, pp. 45-66.

Tao et al., A novel approach to intrusion detection based on Support Vector Data Description, The 30th Annual Conference of the IEEE Industrial Electronics Society, Busan, Korea, Nov. 2, 2004, pp. 2016-2021.

Tax et al., Support vector domain description, Pattern Recognition Letters 20, 1999, pp. 1191-1199.

Xiao et al., Two methods of selecting Gaussian kernel parameters for one-class SVM and their application to fault detection, Knowledge-Based Systems 59, Jan. 27, 2014, pp. 75-84.

Yang et al., A process-mining framework for the detection of healthcare fraud and abuse, Expert Systems with Applications 31, 2006, pp. 56-68.

Ypma et al., Robust Machine Fault Detection With Independent Component Analysis and Support Vector Data Description, Neural Networks for Signal Processing IX, 1999. Proceedings of the 1999 IEEE Signal Processing Society Workshop, Aug. 1999, Madison, WI, pp. 67-76.

Zhao et al., Pattern recognition-based chillers fault detection method using Support Vector Data Description (SVDD), Applied Energy, 2013.

\* cited by examiner

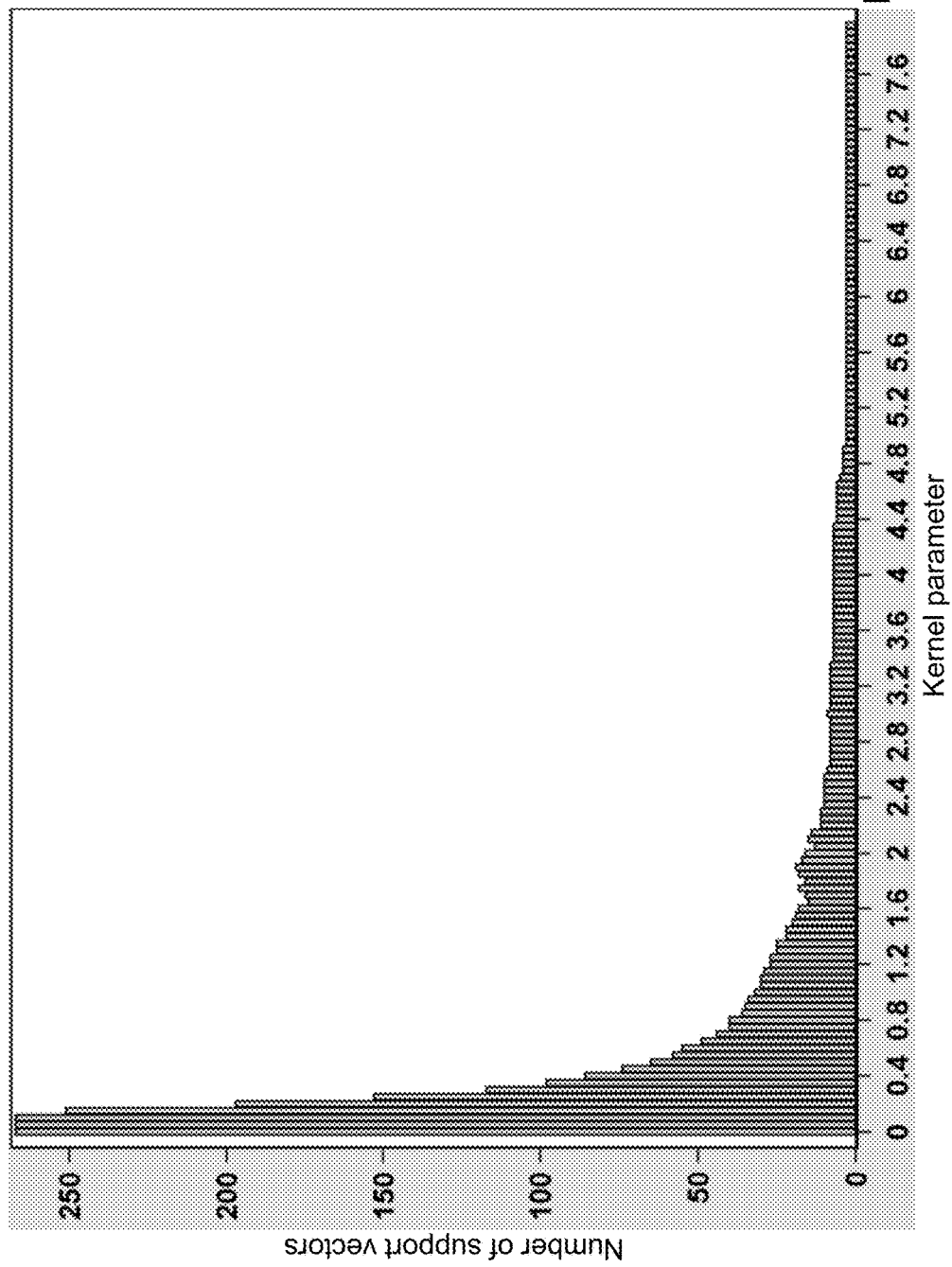

KERNEL PARAMETER SELECTION IN SUPPORT VECTOR DATA DESCRIPTION FOR OUTLIER IDENTIFICATION

CROSS-REFERENCE TO RELATED APPLICATIONS

The present application claims the benefit of 35 U.S.C. §119(e) to U.S. Provisional Patent Application No. 62/293,494 filed on Feb. 10, 2016, the entire contents of which is hereby incorporated by reference.

BACKGROUND

Support vector data description (SVDD) is a machine-learning technique used for single class classification and outlier detection. SVDD formulation with a kernel function provides a flexible boundary around data. The value of kernel function parameters affects the nature of the data boundary.

SUMMARY

In another example embodiment, a non-transitory computer-readable medium is provided having stored thereon computer-readable instructions that, when executed by a computing device, cause the computing device to determine a support vector data description for outlier identification. A plurality of data points are read from a training dataset. A plurality of values are selected for a kernel parameter used by a kernel function. For each of the selected plurality of values for the kernel parameter, an optimal value of an objective function defined for a support vector data description (SVDD) model using the kernel function, the read plurality of data points, and a respective value for the kernel parameter is computed to define a plurality of sets of support vectors. Each set of support vectors defines a boundary for the read plurality of data points in association with the respective value for the kernel parameter. For each of the selected plurality of values for the kernel parameter, the computed optimal value and the defined set of support vectors is stored in association with the respective value for the kernel parameter. A plurality of first derivative values are computed for the objective function as a difference between the computed optimal values associated with successive values for the kernel parameter. A plurality of second derivative values are computed for the objective function as a difference between the computed plurality of first derivative values associated with successive values for the kernel parameter. A value for the kernel parameter is selected where the computed plurality of second derivative values first exceeds zero. The selected value for the kernel parameter is output for identifying an outlier in a scoring dataset.

In yet another example embodiment, a computing device is provided. The system includes, but is not limited to, a processor and a non-transitory computer-readable medium operably coupled to the processor. The computer-readable medium has instructions stored thereon that, when executed by the computing device, cause the computing device to determine a support vector data description for outlier identification.

In an example embodiment, a method of determining a support vector data description for outlier identification is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 7 depicts a number of support vectors as a function of the Gaussian bandwidth parameter value determined using the Gaussian kernel function and the first sample dataset of FIG. 5 in accordance with an illustrative embodiment.

DETAILED DESCRIPTION

Figure 1:
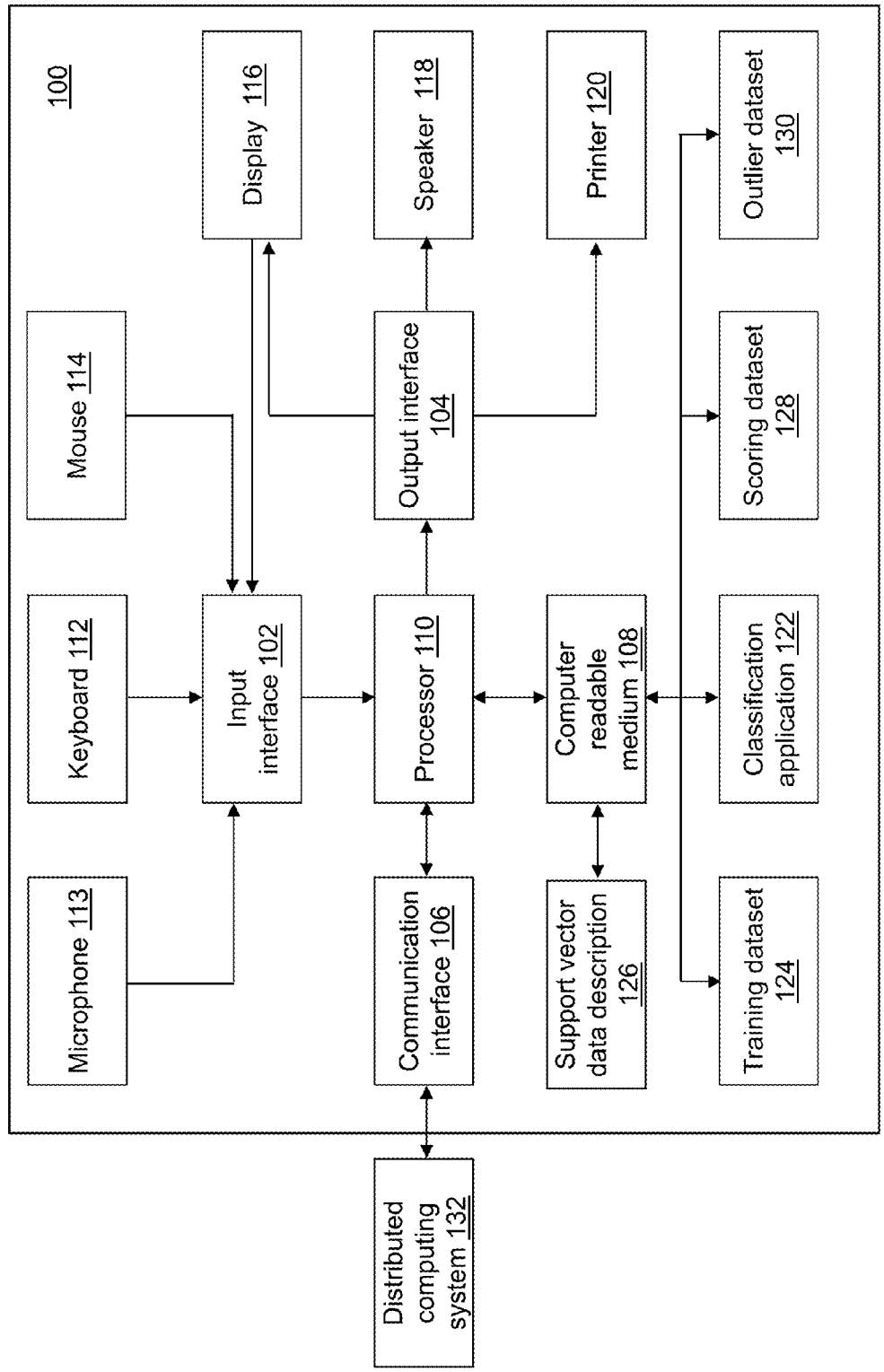
FIG. 1 depicts a block diagram of an outlier identification device in accordance with an illustrative embodiment.

Referring to FIG. 1, a block diagram of an outlier identification device 100 is shown in accordance with an illustrative embodiment. Outlier identification device 100 may include an input interface 102, an output interface 104, a communication interface 106, a non-transitory computer-readable medium 108, a processor 110, a classification application 122, a training dataset 124, a support vector data description (SVDD) 126, a scoring dataset 128, and an outlier dataset 130. Fewer, different, and/or additional components may be incorporated into outlier identification device 100.

Input interface 102 provides an interface for receiving information from the user or another device for entry into outlier identification device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into outlier identification device 100 or to make selections presented in a user interface displayed on the display. The same interface may support both input interface 102 and output interface 104. For example, display 116 comprising a touch screen provides user input and presents output to the user. Outlier identification device 100 may have one or more input interfaces that use the same or a different input interface technology. The input interface technology further may be accessible by outlier identification device 100 through communication interface 106.

Output interface 104 provides an interface for outputting information for review by a user of outlier identification device 100 and/or for use by another application or device. For example, output interface 104 may interface with various output technologies including, but not limited to, display 116, a speaker 118, a printer 120, etc. Outlier identification device 100 may have one or more output interfaces that use the same or a different output interface technology. The output interface technology further may be accessible by outlier identification device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Outlier identification device 100 may have one or more communication interfaces that use the same or a different communication interface technology. For example, outlier identification device 100 may support communication using an Ethernet port, a Bluetooth antenna, a telephone jack, a USB port, etc. Data and messages may be transferred between outlier identification device 100 and a distributed computing system 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Outlier identification device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Outlier identification device 100 also may have one or more drives that support the loading of a memory media such as a CD, DVD, an external hard drive, etc. One or more external hard drives further may be connected to outlier identification device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Outlier identification device 100 may include a plurality of processors that use the same or a different processing technology.

Classification application 122 performs operations associated with defining SVDD 126 from data stored in training dataset 124 and/or with creating outlier dataset 130 from data stored in scoring dataset 128 using SVDD 126. The defined SVDD 126 may be used to classify data stored in scoring dataset 128 and to identify outliers in scoring dataset 128 that are stored in outlier dataset 130 to support various data analysis functions as well as provide alert/messaging related to the identified outliers stored in outlier dataset 130. Dependent on the type of data stored in training dataset 124 and scoring dataset 128, outlier dataset 130 may identify anomalies as part of process control, for example, of a manufacturing process, for machine condition monitoring, for image classification, for intrusion detection, for fraud detection, etc. Some or all of the operations described herein may be embodied in classification application 122. The operations may be implemented using hardware, firmware, software, or any combination of these methods.

Referring to the example embodiment of FIG. 1, classification application 122 is implemented in software (comprised of computer-readable and/or computer-executable instructions) stored in computer-readable medium 108 and accessible by processor 110 for execution of the instructions that embody the operations of classification application 122. Classification application 122 may be written using one or more programming languages, assembly languages, scripting languages, etc. Classification application 122 may be integrated with other analytic tools. For example, classification application 122 may be part of SAS® Enterprise Miner™ developed and provided by SAS Institute Inc. of Cary, N.C. that may be used to create highly accurate predictive and descriptive models based on analysis of vast amounts of data from across an enterprise. Data mining is applicable in a variety of industries.

Classification application 122 may be integrated with other system processing tools to automatically process data generated as part of operation of an enterprise, to identify any outliers in the processed data, and to provide a warning or alert associated with the outlier identification using input interface 102, output interface 104, and/or communication interface 106 so that appropriate action can be initiated in response to the outlier identification.

Classification application 122 may be implemented as a Web application. For example, classification application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observations or records, and the columns may be referred to as variables that are associated with an observation. The variables may define multiple dimensions. Values associated with two or more variables for the same observation may be referred to as a data point. For example, each data point of a plurality of data points is defined in a first dimension using a first variable, in a second dimension using a second variable, etc. The first dimension may be referenced as an x-dimension, the second dimension may be referenced as a y-dimension, the third dimension may be referenced as a z-dimension, etc. When a goal is to render a graph with the data points, the x-dimension may define an x-coordinate, the y-dimension may define a y-coordinate, and the z-dimension may define a z-coordinate. Each data point represents a group of values selected from all or a subset of the columns of training dataset 124 for a single observation. Training dataset 124 may be transposed. Training dataset 124 may include unsupervised data.

Training dataset 124 may be stored on computer-readable medium 108 or on one or more computer-readable media of distributed computing system 132 and accessed by outlier identification device 100 using communication interface 106, input interface 102, and/or output interface 104. Data stored in training dataset 124 may be sensor measurements or signal values captured by a sensor, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns may include a time value.

Data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Some data may be processed with an event stream processing engine (ESPE), which may reside in the cloud or in an edge device before being stored in training dataset 124.

Training dataset 124 may be stored in various compressed formats such as a coordinate format, a compressed sparse column format, a compressed sparse row format, etc. Training dataset 124 further may be stored using various structures as known to those skilled in the art including a file system, a relational database, a system of tables, a structured query language database, etc. on outlier identification device 100 or on distributed computing system 132. Outlier identification device 100 and/or distributed computing system 132 may coordinate access to training dataset 124 that is distributed across a plurality of computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server developed and provided by SAS Institute Inc. of Cary, N.C. may be used as an analytic platform to enable multiple users to concurrently access data stored in training dataset 124. Some systems may use SAS In-Memory Statistics for Hadoop® developed and provided by SAS Institute Inc. of Cary, N.C. to read big data once and analyze it several times by persisting it in-memory for the entire session. Some systems may be of other types and configurations.

A SVDD model is used in domains where a majority of data in training dataset 124 belongs to a single class. An SVDD model for normal data description builds a minimum radius hypersphere around the data. The objective function for the SVDD model for normal data description is $$\max(\Sigma_{i=1}^{n}\alpha_i(x_i \cdot x_i) - \Sigma_{i=1}^{n}\Sigma_{j=1}^{n}\alpha_i\alpha_j(x_i \cdot x_j)), \quad (1)$$

subject to:

$$\Sigma_{i=1}^{n}\alpha_i = 1 \quad (2)$$

$$0 \leq \alpha_i \leq C, \forall i=1, \ldots, n, \quad (3)$$

where $x_i \in \mathbb{R}^m$, $i=1, \ldots, n$ represents the data points in training dataset 124, n is the number of data points, $\alpha_i \in \mathbb{R}$; are Lagrange constants, $C=1/nf$ is a penalty constant that controls a trade-off between a volume and errors, and f is an expected outlier fraction. The expected fraction outlier is generally known to an analyst. Data preprocessing can ensure that training dataset 124 belongs to a single class. In this case, f can be set to a very low value. $SV_{<C}$, is the set of support vectors that includes the data points in training dataset 124 (observations) that have $C > \alpha_i > 0$.

Depending upon a position of an observation, the following results are true:

Center position: $\Sigma_{i=1}^{n}\alpha_i x_i = \alpha$. (4)

Inside position: $\|x_i - \alpha\| < R \rightarrow \alpha_i = 0$. (5)

Boundary position: $\|x_i - \alpha\| = R \rightarrow 0 < \alpha_i < C$. (6)

Outside position: $\|x_i - \alpha\| > R \rightarrow \alpha_i = C$. (7)

where $\alpha$ is a center of the hypersphere and R is a radius of the hypersphere. The radius of the hypersphere is calculated as:

$$R^2 = (x_k \cdot x_k) - 2\Sigma_{i=1}^{n}\alpha_i(x_i \cdot x_k)\Sigma_{i=1}^{n}\Sigma_{j=1}^{n}\alpha_i\alpha_j(x_i \cdot x_k)) \quad (8)$$

using any $x_k \in SV_{-C}$.

Figure 2:
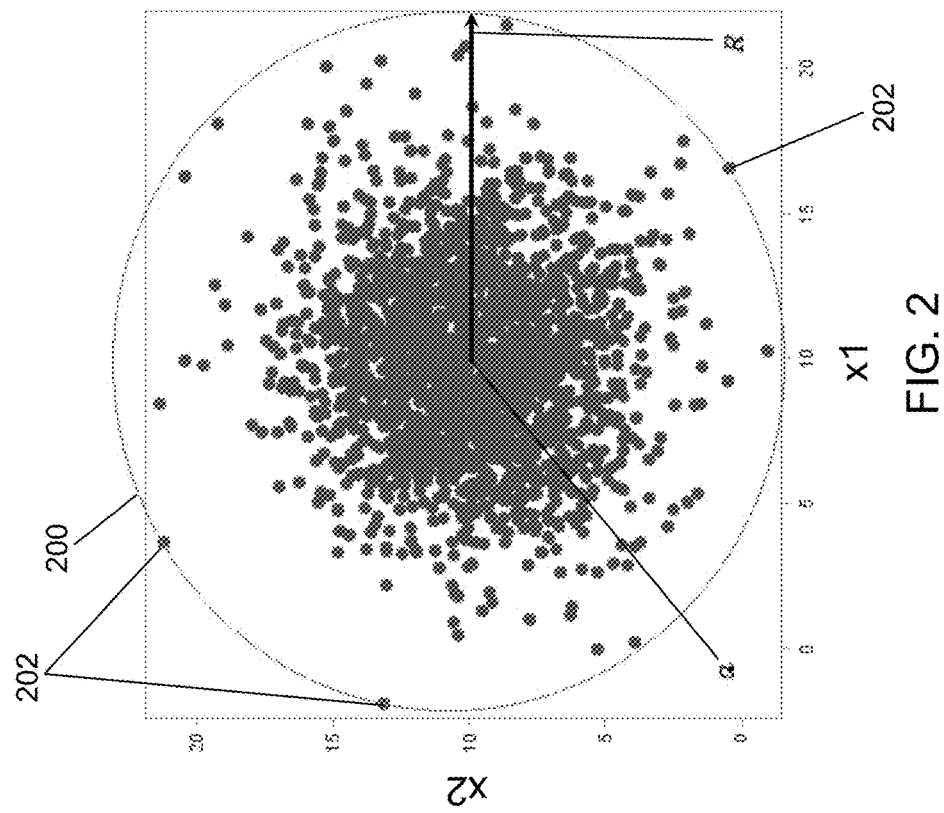
FIG. 2 depicts a support vector data description (SVDD) result defining a normal data boundary in accordance with an illustrative embodiment.

A data point z is indicated as an outlier when $dist^2(z) > R^2$, where $dist^2(z) = (z \cdot z) - 2\Sigma_{i=1}^{n}\alpha_i(x_i \cdot z) + \Sigma_{i=1}^{n}\Sigma_{j=1}^{n}\alpha_i\alpha_j(x_i \cdot x_j)$, $R^2$ is a threshold, and z is the observation vector. Referring to FIG. 2, a SVDD is shown in accordance with an illustrative embodiment that defines a normal data boundary 200 having a radius R from a center $\alpha$. Data boundary 200 is characterized by observations 202, which are the set of support vectors $SV_{<C}$.

The normal data boundary 200 can include a significant amount of space with a very sparse distribution of training observations. Scoring with this model can increase the probability of false positives. Hence, instead of a circular shape, a compact bounded outline around the data that approximates a shape of data in training dataset 124 is preferred. This is possible using a kernel function. The SVDD is made flexible by replacing the inner product $(x_i \cdot x_j)$ with a suitable kernel function $K(x_i, x_j)$. A Gaussian kernel function is described herein, though this is not intended to be limiting. For example, any exponential function with a similar kernel parameter may be used. The Gaussian kernel function may be defined as:

$$K(x_i, x_j) = \exp\frac{-\|x_i - x_j\|^2}{2s^2} \quad (9)$$

where s is a kernel parameter that is termed a Gaussian bandwidth parameter.

The objective function for the SVDD model with the Gaussian kernel function is $$\max(\Sigma_{i=1}^{n}\alpha_i K(x_i,x_i) - \Sigma_{i=1}^{n}\Sigma_{j=1}^{n}\alpha_i\alpha_j K(x_i,x_1)), \quad (10)$$

subject to:

$$\Sigma_{i=1}^{n}\alpha_i = 1, \quad (11)$$

$$0 \leq \alpha_i \leq C, \forall i=1, \ldots, n. \quad (12)$$

$SV_{<C}$, again defines the set of support vectors that have $0 < \alpha_k < C$.

The results from equations (4) to (7) above remain valid. The threshold is computed as:

$$R^2 = K(x_k, x_k) - 2\Sigma_{i=1}^{n}\alpha_i K(x_i, x_k) + \Sigma_{i=1}^{n}\Sigma_{j=1}^{n}\alpha_i\alpha_j K(x_i, x_k) \quad (13)$$

using any $x_k \in SV_{<C}$. A data point (observation) z is indicated as an outlier when $dist^2(z) > R^2$, where $dist^2(z) = K(z,z) - 2\Sigma_{i=1}^{n}\alpha_i K(x_i, z) + \Sigma_{i=1}^{n}\Sigma_{j=1}^{n}\alpha_i\alpha_j K(x_i, x_j)$.

Figure 3:
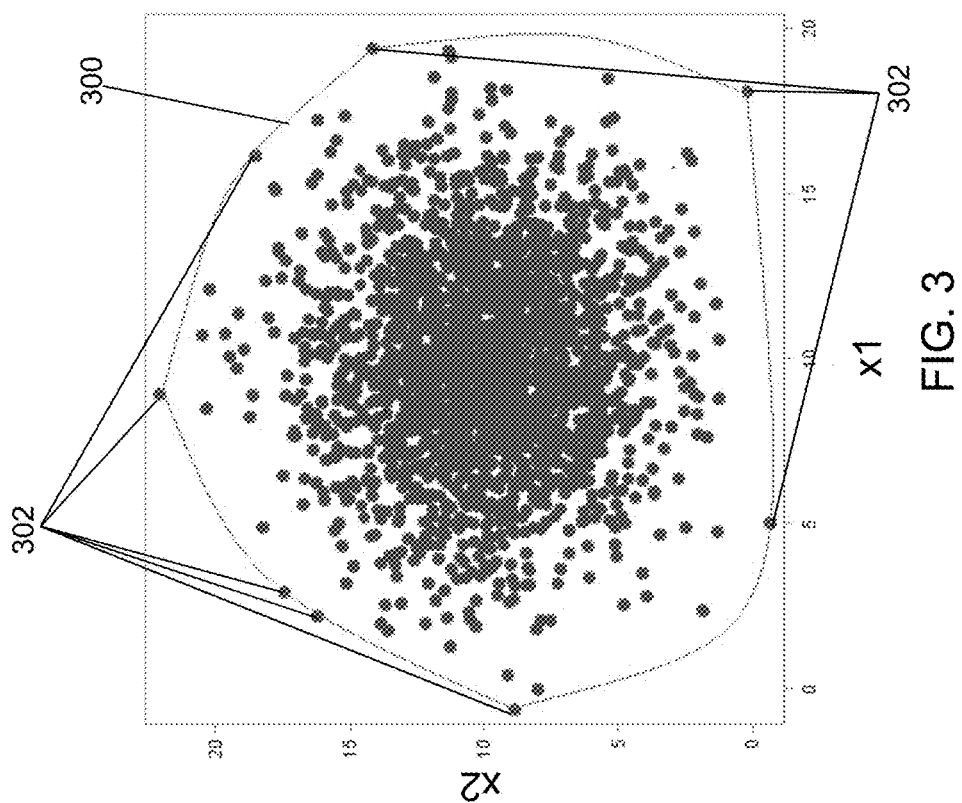
FIG. 3 depicts an SVDD result defining a flexible data boundary using a Gaussian kernel function in accordance with an illustrative embodiment.

Referring to FIG. 3, a SVDD is shown in accordance with an illustrative embodiment that defines a flexible data boundary 300. Flexible data boundary 300 is characterized by observations 302, which are the set of support vectors $SV_{-C}$.

Figure 4A:
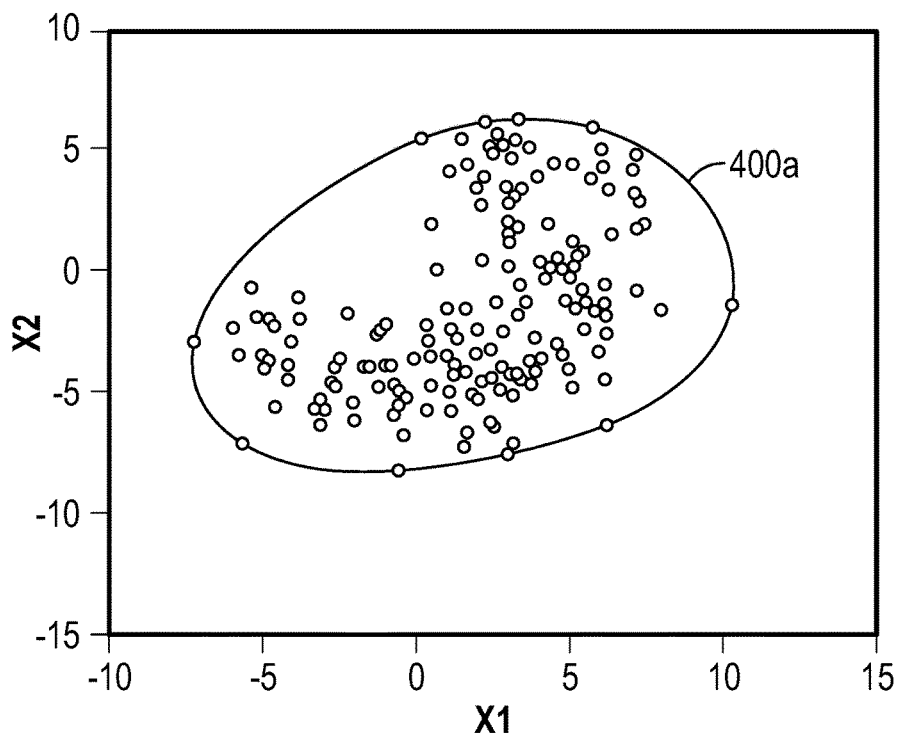
FIGS. 4A-4C depict SVDD results for a dataset using the Gaussian kernel function and different kernel parameter values in accordance with an illustrative embodiment.
Figure 4B:
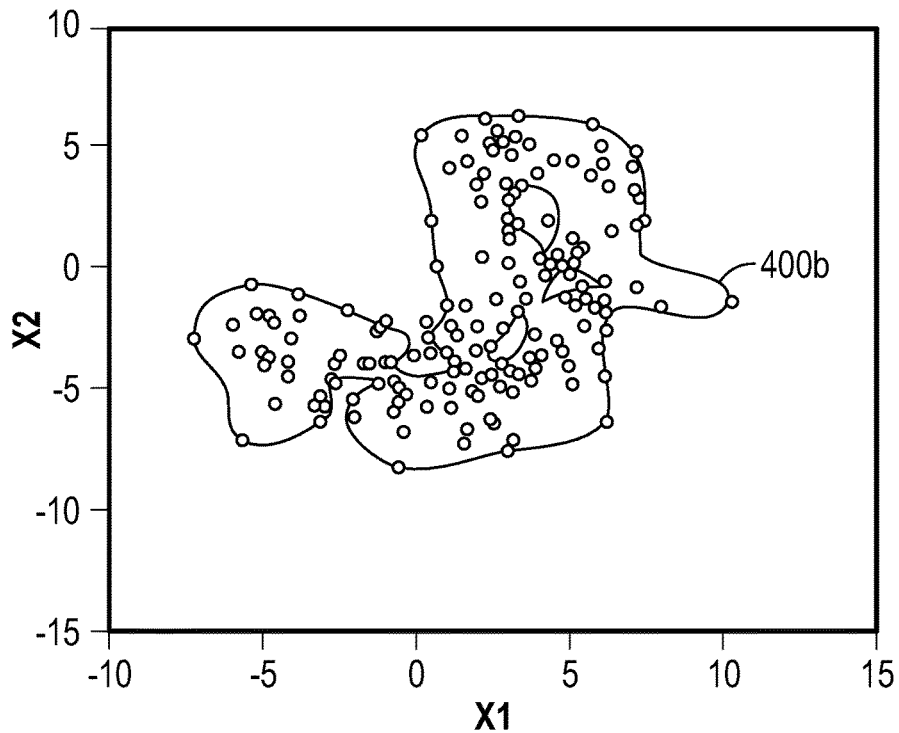
Figure 4C:
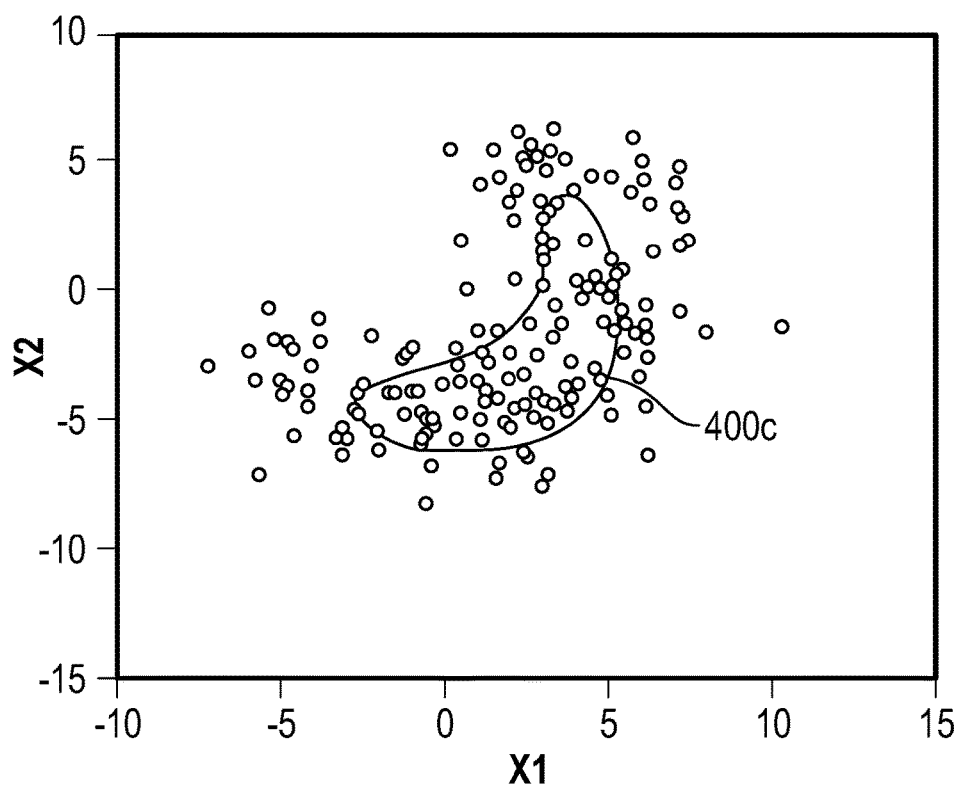

A variation in SVDD was determined for an illustrative dataset using the Gaussian kernel function and based on selection of a value of the kernel parameter s and selection of a value of the expected outlier fraction f. The results were generated by and described in a paper by Thuntee Sukchotrata, Seoung Bum Kimb and Fugee Tsungc, One-class classification-based control charts for multivariate process monitoring, IIE Transactions, Volume 42, Issue 2, 2009. Referring to FIGS. 4A to 4C, illustrative results from that paper are shown. Referring to FIG. 4A, a first boundary 400a is defined for s=10 and f=0.01 by optimizing the objective function. Referring to FIG. 4B, a second boundary 400b is defined for s=3 and f=0.01 by optimizing the objective function. Referring to FIG. 4C, a third boundary 400c is defined for s=3 and f=0.8 by optimizing the objective function. A low value of s makes the data boundary wiggly to provide a better fit to the data; whereas, a high value of s approaches a spherical data boundary. Selecting a value of s that provides a good quality SVDD requires examination of different values of s.

Figure 5:
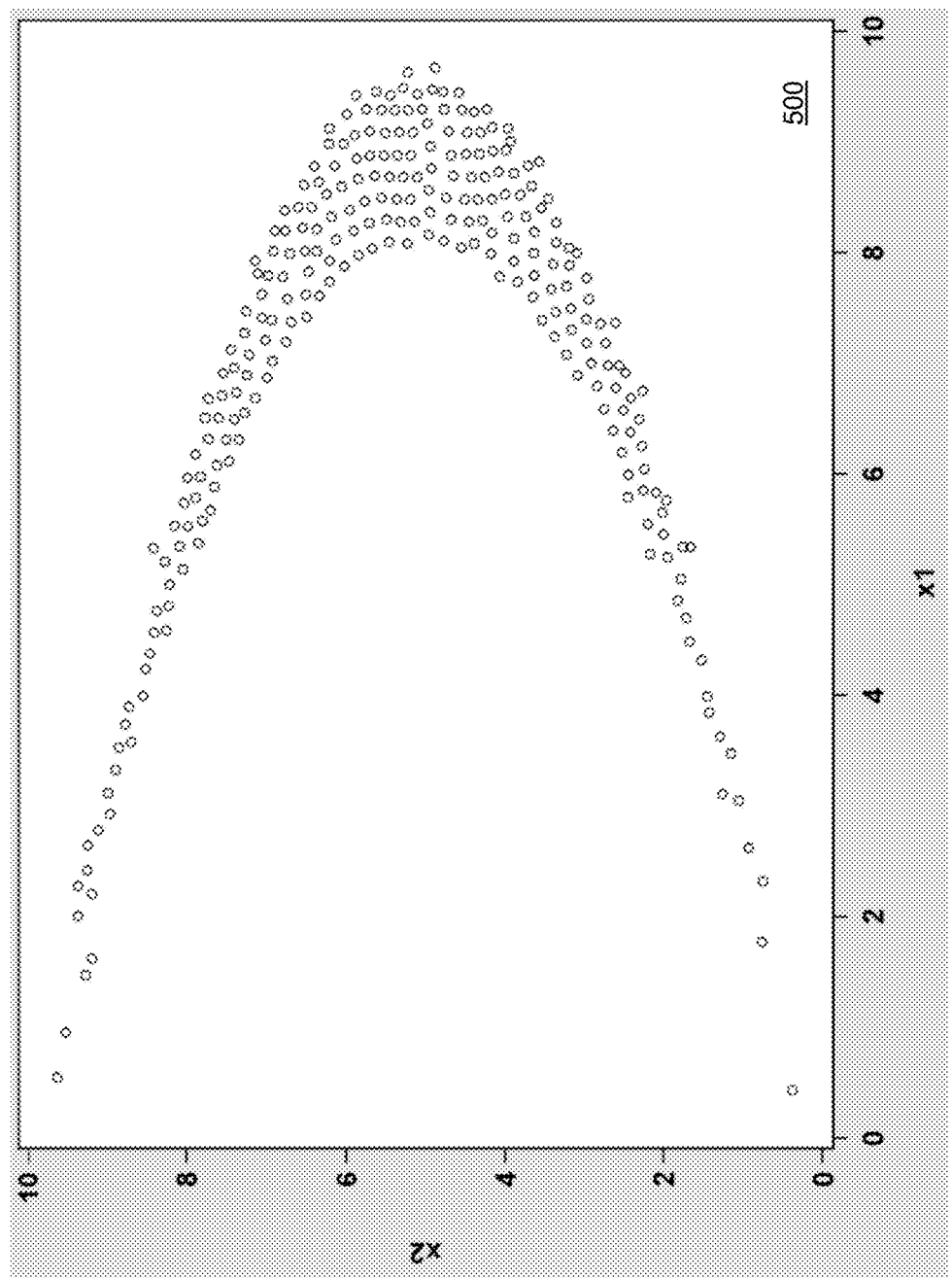
FIG. 5 depicts a first sample dataset having a banana shape in accordance with an illustrative embodiment.

Referring to FIG. 5, a first sample dataset 500 including a first dimension x1 and a second dimension x2 having a banana shape is shown for training dataset 124 in accordance with an illustrative embodiment.

Figure 6A:
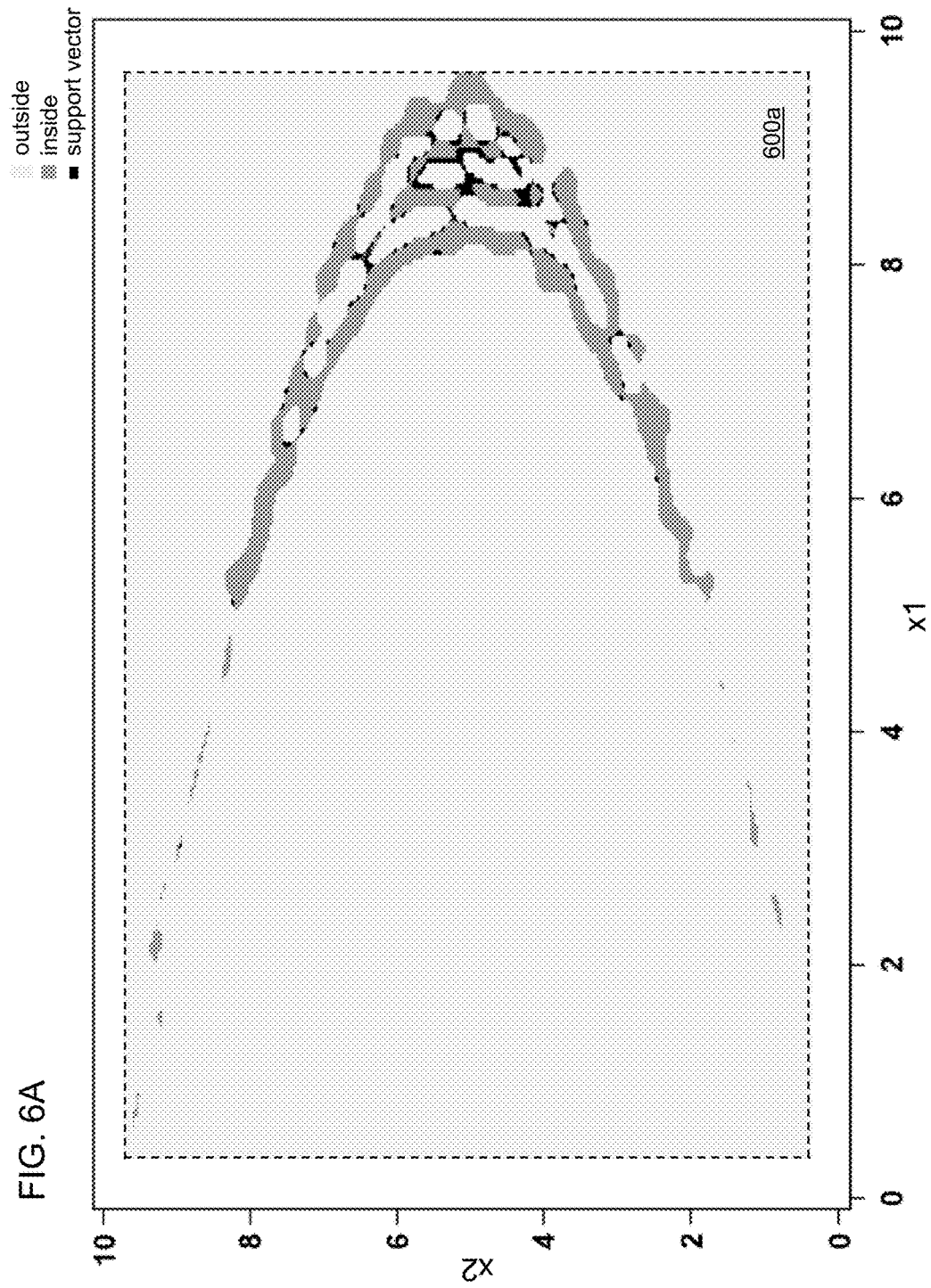
FIGS. 6A to 6E depict SVDD scoring results using the Gaussian kernel function, different Gaussian bandwidth parameter values, and the first sample dataset of FIG. 5 in accordance with an illustrative embodiment.

Referring to FIGS. 6A to 6E, variations in SVDD were determined for first sample dataset 500 using the Gaussian kernel function and different values for the kernel parameter s and scoring on a 200×200 data grid are shown. For each SVDD determination shown in FIGS. 6A to 6E, f=0.001 was used as part of optimizing the objective function. Referring to FIG. 6A, a first SVDD 600a is shown for s=0.2 after optimizing the objective function. A black dot indicates a support vector (boundary position), a dark gray dot indicates an inside data point, and a light gray dot indicates an outside data point based on a mathematical description of first SVDD 600a.

Figure 6B:
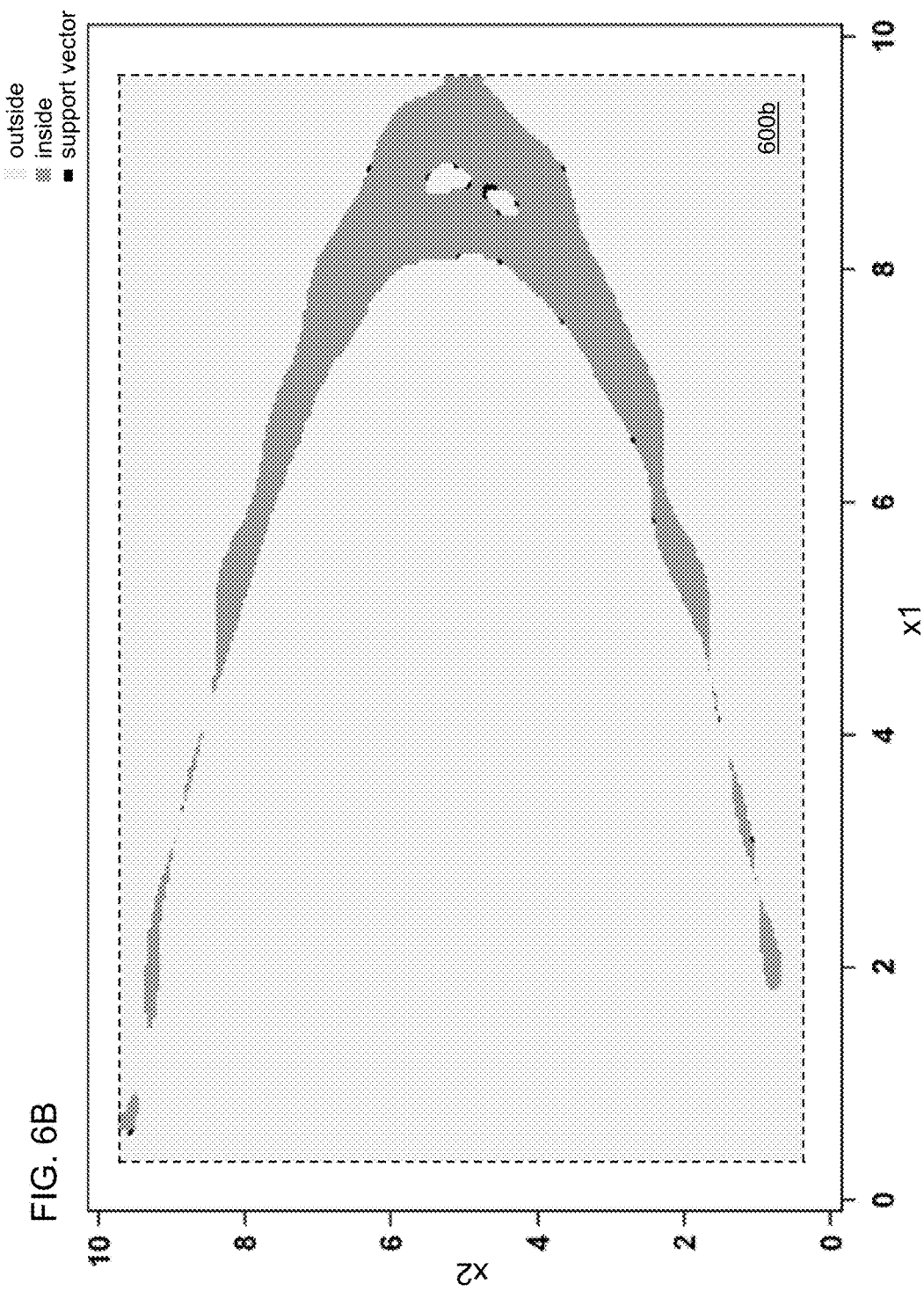

Referring to FIG. 6B, a second SVDD 600b is shown for s=0.5 after optimizing the objective function. A black dot indicates a support vector (boundary position), a dark gray dot indicates an inside data point, and a light gray dot indicates an outside data point based on a mathematical description of second SVDD 600b.

Figure 6C:
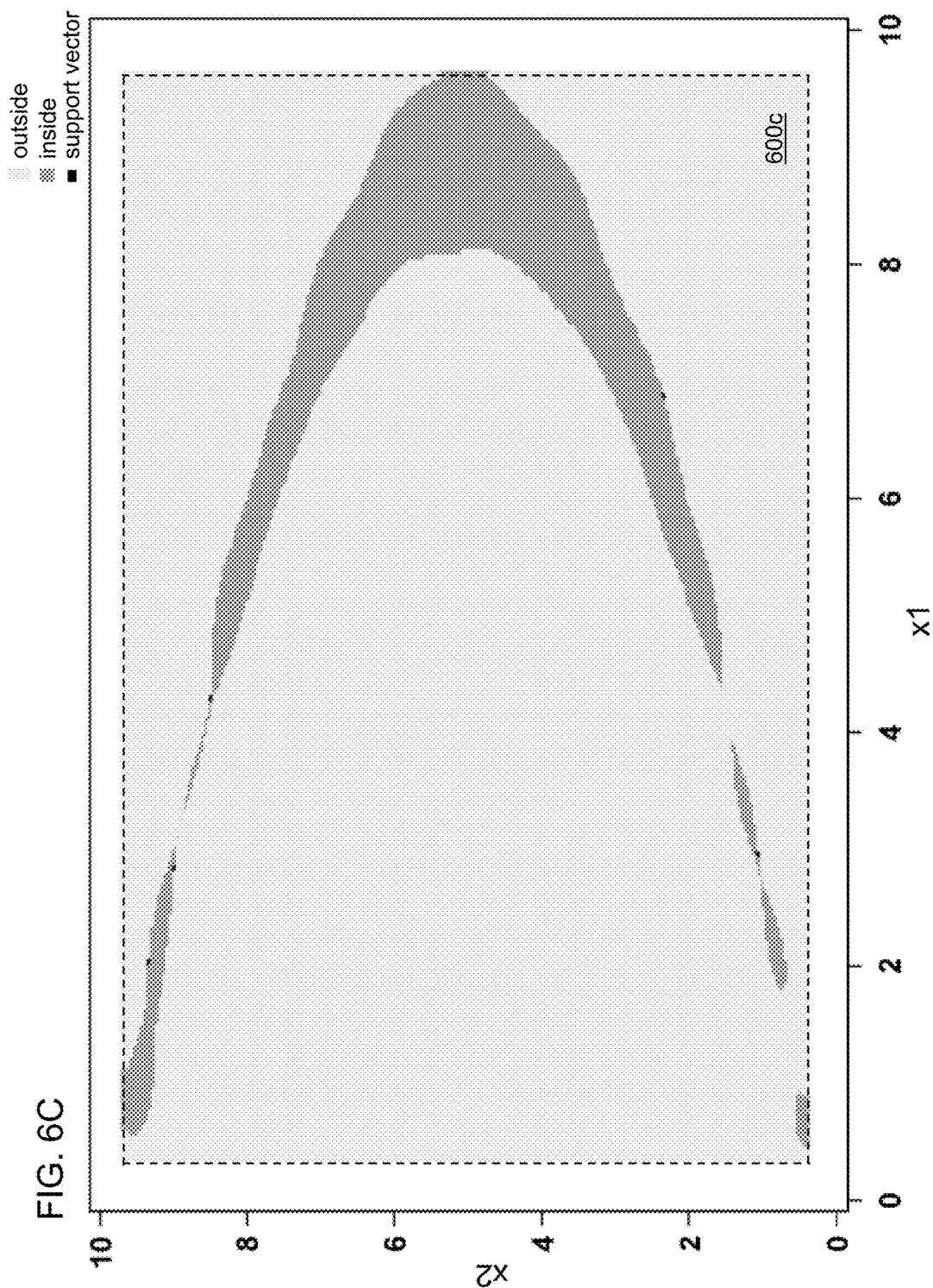

Referring to FIG. 6C, a third SVDD 600c is shown for s=0.7 after optimizing the objective function. A black dot indicates a support vector (boundary position), a dark gray dot indicates an inside data point, and a light gray dot indicates an outside data point based on a mathematical description of third SVDD 600c.

Figure 6D:
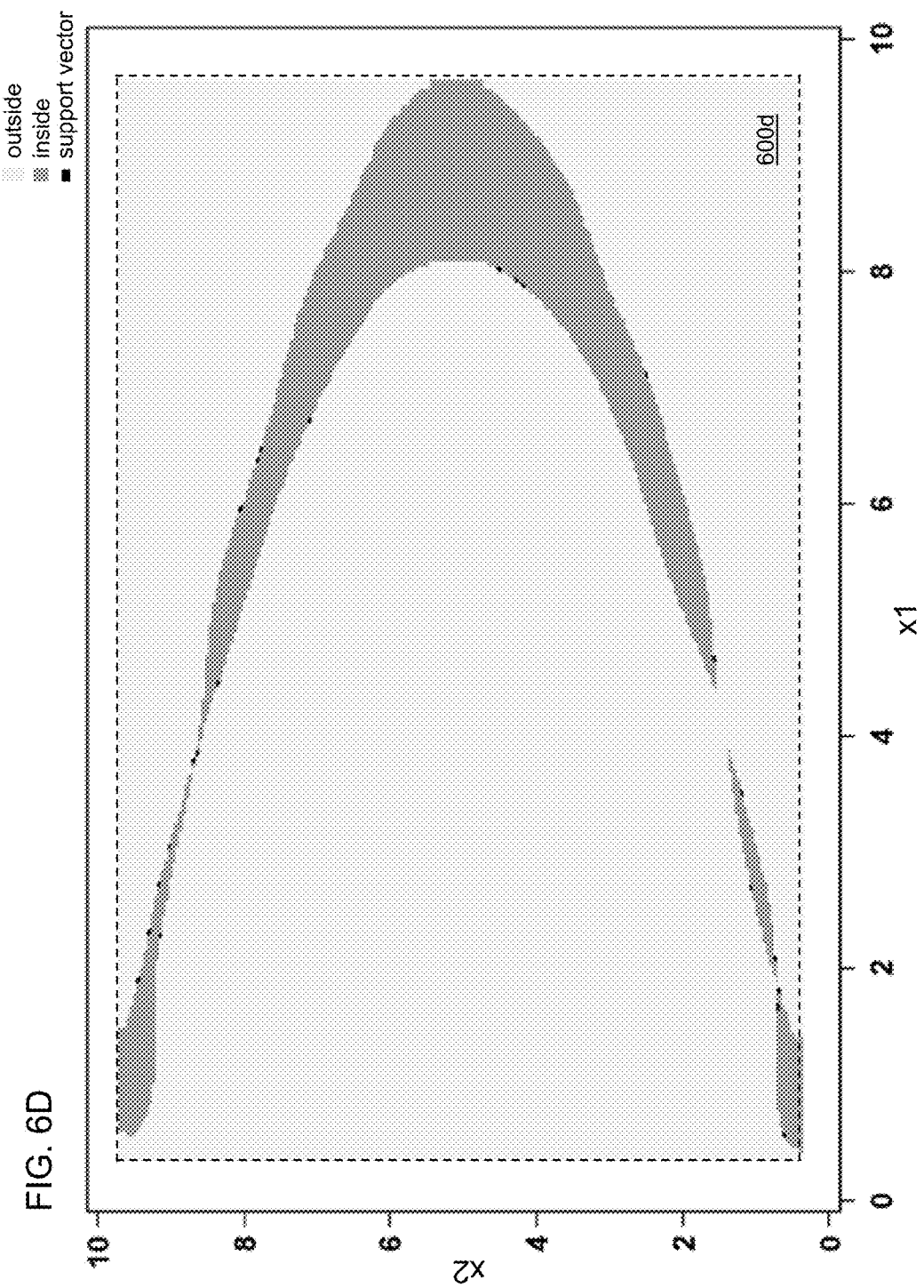

Referring to FIG. 6D, a fourth SVDD 600d is shown for s=0.9 after optimizing the objective function. A black dot indicates a support vector (boundary position), a dark gray dot indicates an inside data point, and a light gray dot indicates an outside data point based on a mathematical description of fourth SVDD 600d.

Figure 6E:
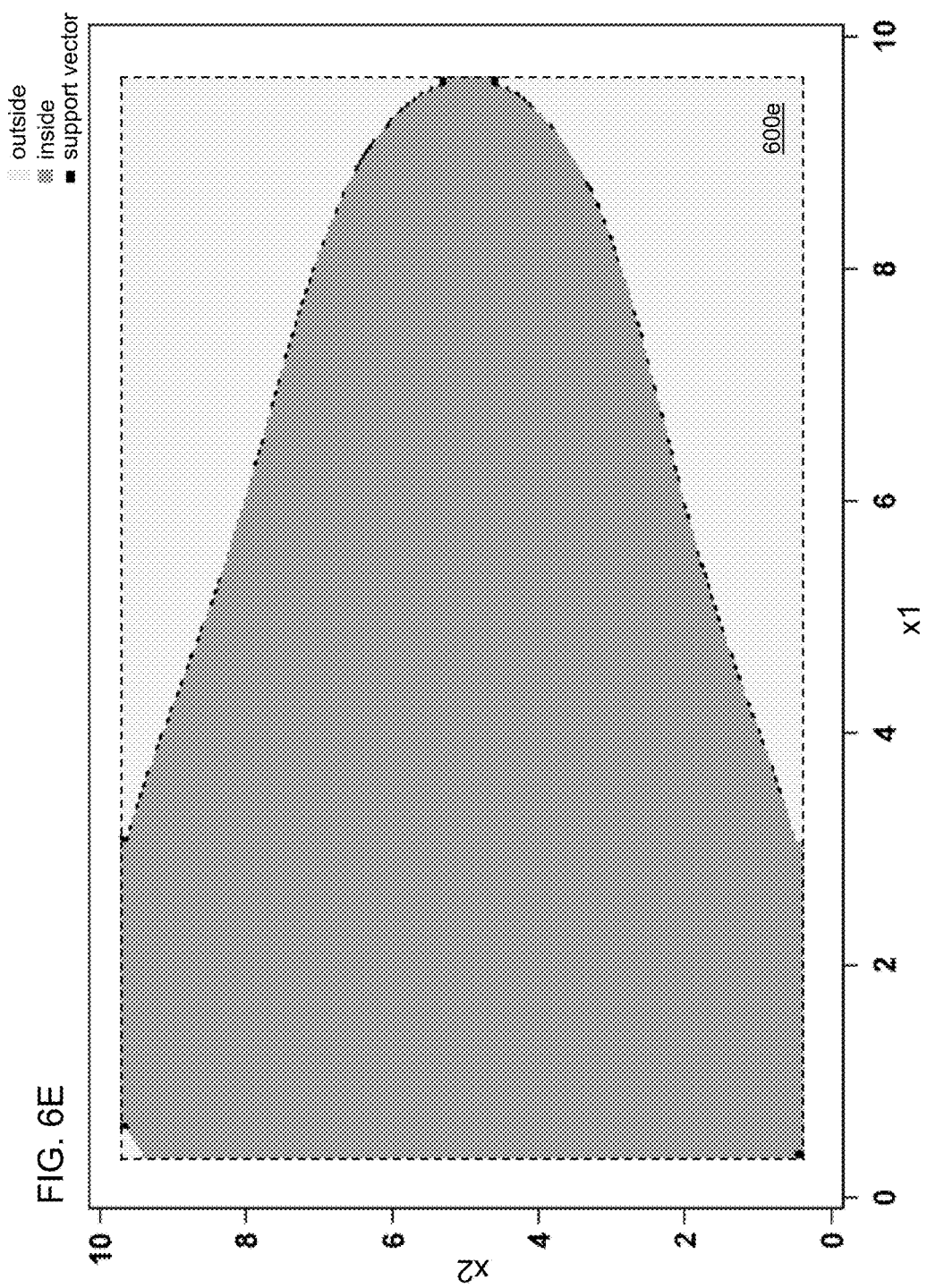

Referring to FIG. 6E, a fifth SVDD 600e is shown for s=4.1 after optimizing the objective function. A black dot indicates a support vector (boundary position), a dark gray dot indicates an inside data point, and a light gray dot indicates an outside data point based on a mathematical description of fifth SVDD 600e. As discussed previously, a lower value of s makes the data boundary wiggly to provide a better fit to the data; whereas, a higher value of s approaches a spherical data boundary. The values of s used to create the results shown in FIGS. 6B, 6C, 6D visually appear to provide a good quality SVDD.

Referring to FIG. 7, a number of support vectors as a function of the kernel parameter s determined by optimizing the objective function using the Gaussian kernel function and first sample dataset 500 is shown in accordance with an illustrative embodiment. The flexible SVDD is preferred when the data boundary needs to closely follow a shape of the data. The tightness of the boundary is a function of the number of support vectors. In the case of a Gaussian kernel function, if the value of the expected outlier fraction f is kept constant, the number of support vectors identified by the SVDD algorithm is a function of the kernel parameter s. At a very low value of s, the number of support vectors is very high, approaching the number of observations. As the value of s increases, the number of support vectors reduces. Classification application 122 provides an empirical criterion for selecting a good value of the kernel parameter s such that a corresponding data boundary is smooth and captures essential visual features of the data included in training dataset 124.

Training dataset 124 and scoring dataset 128 may be generated, stored, and accessed using the same or different mechanisms. Similar to training dataset 124, scoring dataset 128 may include a plurality of rows and a plurality of columns with the plurality of rows referred to as observations or records, and the columns referred to as variables that are associated with an observation. Scoring dataset 128 may be transposed.

Similar to training dataset 124, scoring dataset 128 may be stored on computer-readable medium 108 or on one or more computer-readable media of distributed computing system 132 and accessed by outlier identification device 100 using communication interface 106. Data stored in scoring dataset 128 may be a sensor measurement or a data communication value, may be generated or captured in response to occurrence of an event or a transaction, generated by a device such as in response to an interaction by a user with the device, etc. The data stored in scoring dataset 128 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in scoring dataset 128 may be captured at different time points periodically, intermittently, when an event occurs, etc. One or more columns may include a time value. Similar to training dataset 124, data stored in scoring dataset 128 may be generated as part of the IoT, and some data may be processed with an ESPE.

Similar to training dataset 124, scoring dataset 128 may be stored in various compressed formats such as a coordinate format, a compressed sparse column format, a compressed sparse row format, etc. Scoring dataset 128 further may be stored using various structures as known to those skilled in the art including a file system, a relational database, a system of tables, a structured query language database, etc. on outlier identification device 100 or on distributed computing system 132. Outlier identification device 100 and/or distributed computing system 132 may coordinate access to scoring dataset 128 that is distributed across a plurality of computing devices. For example, scoring dataset 128 may be stored in a cube distributed across a grid of computers as understood by a person of skill in the art. As another example, scoring dataset 128 may be stored in a multi-node Hadoop® cluster. For instance, Apache™ Hadoop® is an open-source software framework for distributed computing supported by the Apache Software Foundation. As another example, scoring dataset 128 may be stored in a cloud of computers and accessed using cloud computing technologies, as understood by a person of skill in the art. The SAS® LASR™ Analytic Server developed and provided by SAS Institute Inc. of Cary, N.C. may be used as an analytic platform to enable multiple users to concurrently access data stored in scoring dataset 128.

Figure 8A:
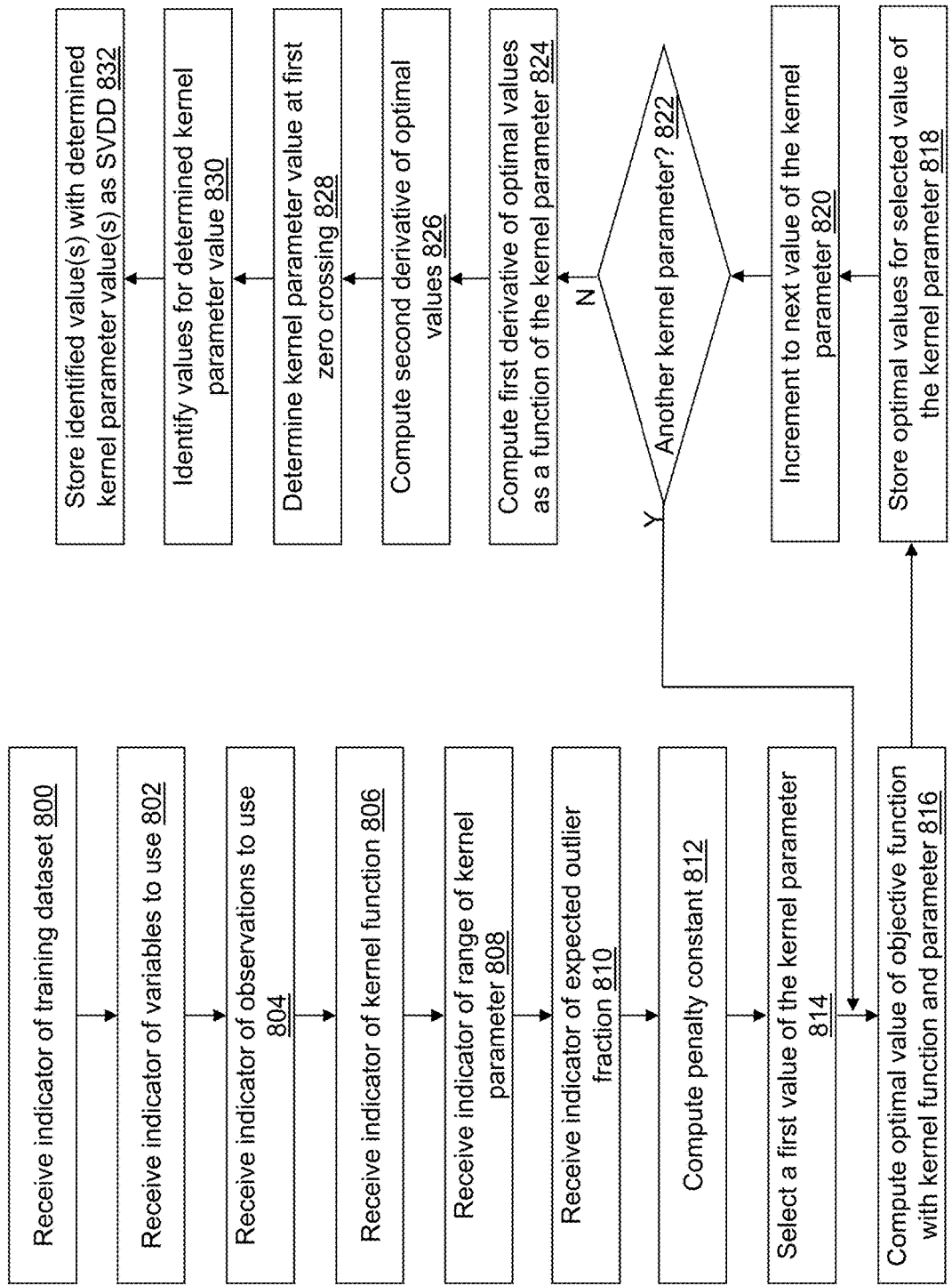
FIGS. 8A and 8B depict a flow diagram illustrating examples of operations performed by the outlier identification device of FIG. 1 in accordance with an illustrative embodiment.
Figure 8B:
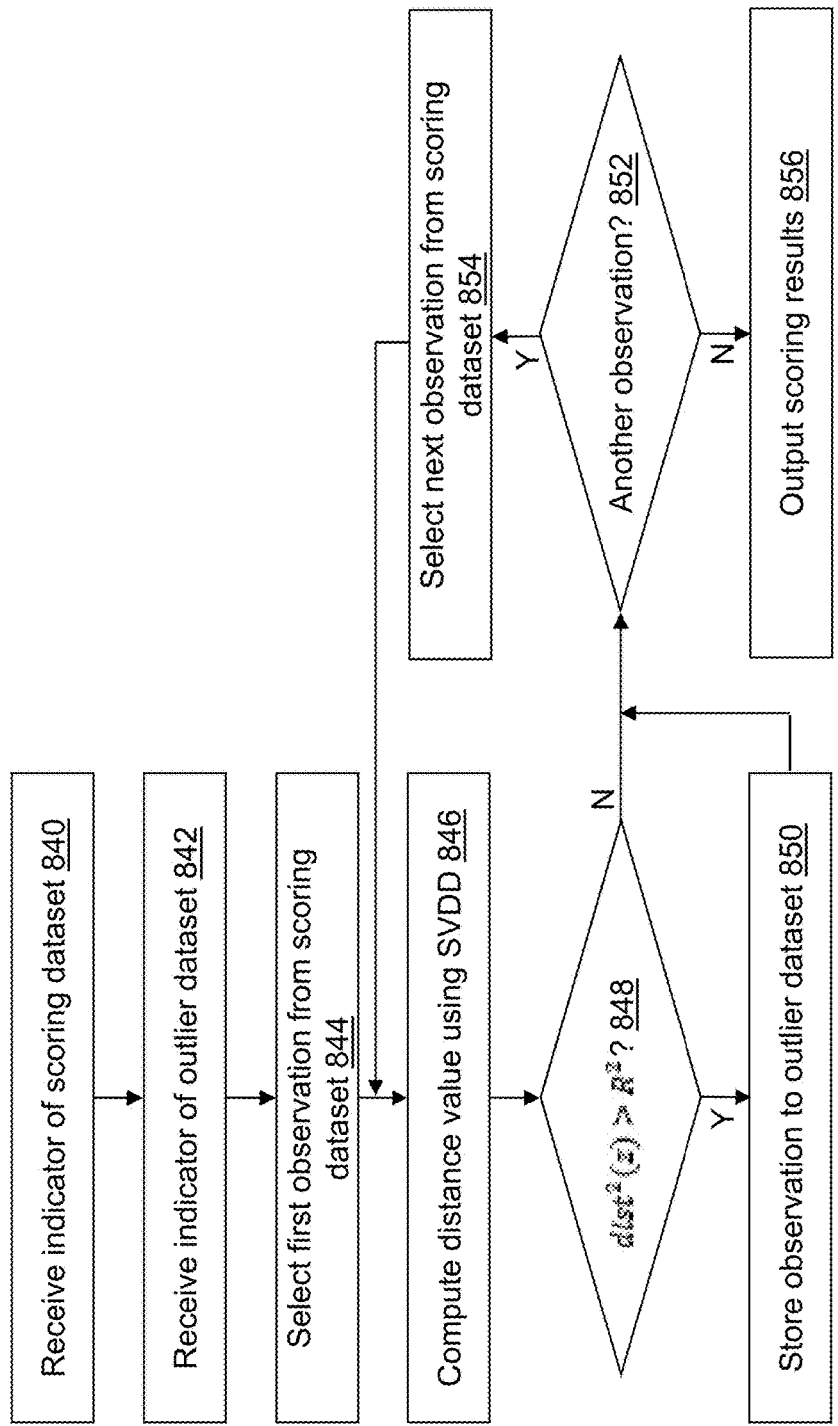
Figure 9:
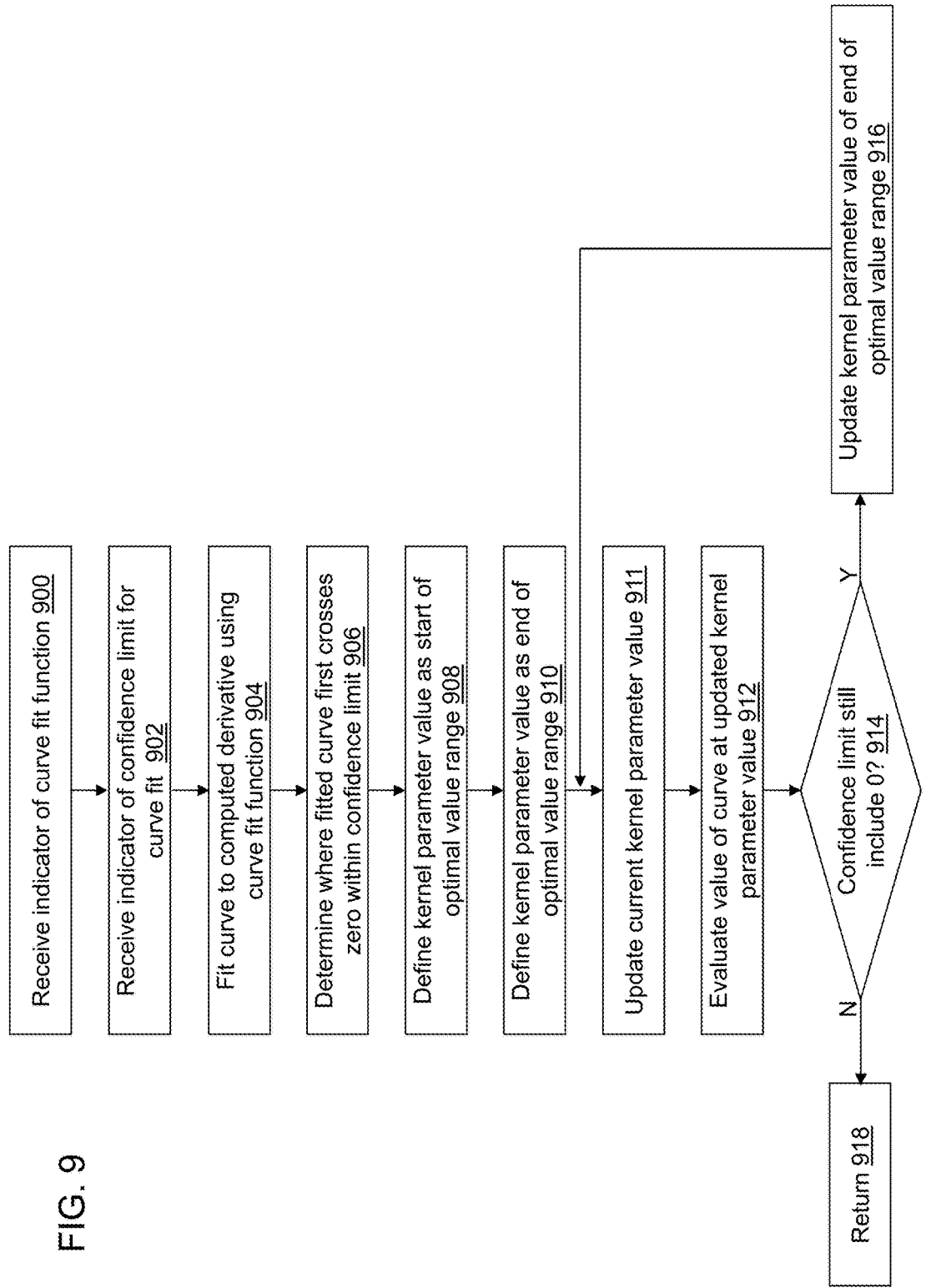
FIG. 9 depicts a flow diagram illustrating additional examples of operations performed by the outlier identification device of FIG. 1 in accordance with an illustrative embodiment.

Referring to FIGS. 8A, 8B, and 9, example operations associated with classification application 122 are described. For example, classification application 122 may be used to create SVDD 126 from training dataset 124. Additional, fewer, or different operations may be performed depending on the embodiment. The order of presentation of the operations of FIGS. 8A and 8B is not intended to be limiting. Although some of the operational flows are presented in sequence, the various operations may be performed in various repetitions, concurrently (in parallel, for example, using threads and/or distributed computing system 132), and/or in other orders than those that are illustrated. For example, a user may execute classification application 122, which causes presentation of a first user interface window, which may include a plurality of menus and selectors such as drop down menus, buttons, text boxes, hyperlinks, etc. associated with classification application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by classification application 122.

Referring to FIG. 8A, in an operation 800, a first indicator is received that indicates training dataset 124. For example, the first indicator indicates a location and a name of training dataset 124. As an example, the first indicator may be received by classification application 122 after selection from a user interface window or after entry by a user into a user interface window. In an alternative embodiment, training dataset 124 may not be selectable. For example, a most recently created dataset may be used automatically.

In an operation 802, a second indicator is received that indicates a plurality of variables of training dataset 124 to define $x_i$. The second indicator may indicate that all or only a subset of the variables stored in training dataset 124 be used to define SVDD 126. For example, the second indicator indicates a list of variables to use by name, column number, etc. In an alternative embodiment, the second indicator may not be received. For example, all of the variables may be used automatically.

In an operation 804, a third indicator is received that indicates a plurality of observation of training dataset 124 to define n. The third indicator may indicate that only a subset of the observations stored in training dataset 124 be included. The third indicator further may indicate a number of data points of training dataset 124 to use, a percentage of data points of training dataset 124 to use, etc. A subset of the data points may be created from training dataset 124 by sampling. An example sampling algorithm is uniform sampling. Other random sampling algorithms may be used. In an alternative embodiment, the third indicator may not be received. For example, all of the data points may be used automatically by default or without allowing a selection. As another option, a subset of data may be selected or identified using rules such as filters. As an example, data may be captured for a vibration level of a washing machine. A washing machine mode, such as "fill", "wash", "spin", etc. may be captured. Because a "normal" vibration level may be different dependent on the washing machine mode, a subset of data may be selected for a specific washing machine mode setting based on a value in a column of training dataset 124 that defines the washing machine mode. SVDD models may be defined for different modes of the machine.

In an operation 806, a fourth indicator of a kernel function to apply is received. For example, the fourth indicator indicates a name of a kernel function. The fourth indicator may be received by classification application 122 after selection from a user interface window or after entry by a user into a user interface window. A default value for the kernel function may further be stored, for example, in computer-readable medium 108. As an example, a kernel function may be selected from "Gaussian", "Exponential", etc. For example, a default kernel function may be the Gaussian kernel function though any positive definite kernel function could be used. Of course, the kernel function may be labeled or selected in a variety of different manners by the user as understood by a person of skill in the art. In an alternative embodiment, the kernel function may not be selectable, and a single kernel function is implemented in classification application 122. For example, the Gaussian kernel function may be used by default or without allowing a selection.

In an operation 808, a fifth indicator of a range of kernel parameter values to test with the indicated kernel function is received. For example, a minimum kernel parameter value, a maximum kernel parameter value, and an incremental kernel parameter value are received. In an alternative embodiment, the fifth indicator may not be received. For example, default values for the range of kernel parameter values may be stored, for example, in computer-readable medium 108 and used automatically. In another alternative embodiment, the value of the expected range of kernel parameter values may not be selectable. Instead, fixed, predefined values may be used.

In an operation 810, a sixth indicator of a value of the expected outlier fraction f is received. In an alternative embodiment, the sixth indicator may not be received. For example, a default value may be stored, for example, in computer-readable medium 108 and used automatically. As another example, depending on the kernel function selected in operation 806, no value of the expected outlier fraction f may be used. In another alternative embodiment, the value of the expected outlier fraction f may not be selectable. Instead, a fixed, predefined value may be used.

In an operation 812, a value of the penalty constant C=1/nf is computed from n and f. n may be defined based on a size of training dataset 124 or based on the third indicator. f may be defined based on the fixed, predefined value or based on the sixth indicator. In an alternative embodiment, depending on the kernel function selected in operation 806, no value of the penalty constant may be computed or used.

In an operation 814, a first value for the kernel parameter is selected. For example, the kernel parameter may be s when the kernel function selected is the Gaussian kernel function. For example, the first value may be selected as the minimum kernel parameter value defined based on the fifth indicator. In an alternative embodiment, the first value may be selected as the maximum kernel parameter value defined based on the fifth indicator.

In an operation 816, an optimal value for the objective function is computed by optimizing the objective function using the kernel function defined based on the fourth indicator and the selected value for the kernel parameter. For example, equations (10)-(13) above are used to solve for $SV_{<C}$, the set of support vectors that have $0<\alpha_1<C$, $\alpha_1$ the Lagrange constants for each $SV_{<C}$, $R^2$ the threshold used for scoring, and the optimal value.

In an operation 818, $SV_{<C}$, $\alpha_1$, $R^2$, and/or the optimal value computed in operation 816 are stored, for example, in computer-readable medium 108, in association with the selected value for the kernel parameter. Depending on the kernel function used, one or more constant values included in a subsequent computation of $dist^2(z)$ may also be stored. For example, using the Gaussian kernel function, K(z, z)=1 may be stored. As another example, using the Gaussian kernel function, the value of $\Sigma_{i=1}^{n}\Sigma_{j=1}^{n}\alpha_i\alpha_jK(x_i,x_j)$ is constant and already determined so the value may be stored. These values can also be stored in association with the selected value for the kernel parameter.

In an operation 820, a next value of the kernel parameter is determined by incrementing the current value using the incremental kernel parameter value. For example, when the first value in operation 814 was the minimum kernel parameter value, the next value is the current value plus the incremental kernel parameter value. When the first value in operation 814 was the maximum kernel parameter value, the next value is the current value minus the incremental kernel parameter value.

In an operation 822, a determination is made concerning whether or not there is another kernel parameter value to evaluate. For example, the next value is compared to the maximum kernel parameter value or to the minimum kernel parameter value. When the first value in operation 814 was the minimum kernel parameter value, the next value is compared to the maximum kernel parameter value. When the next value is greater than the maximum kernel parameter value, processing continues in an operation 824. When the next value is less than or equal to the maximum kernel parameter value, processing continues in operation 816 to compute the optimal values using the next value for the kernel parameter.

When the first value in operation 814 was the maximum kernel parameter value, the next value is compared to the minimum kernel parameter value. When the next value is less than the minimum kernel parameter value, processing continues in operation 824. When the next value is greater than or equal to the minimum kernel parameter value, processing continues in operation 816 to compute the optimal values using the next value for the kernel parameter. Of course, the evaluations may be inclusive or exclusive of the maximum/minimum kernel parameter values.

Figure 10:
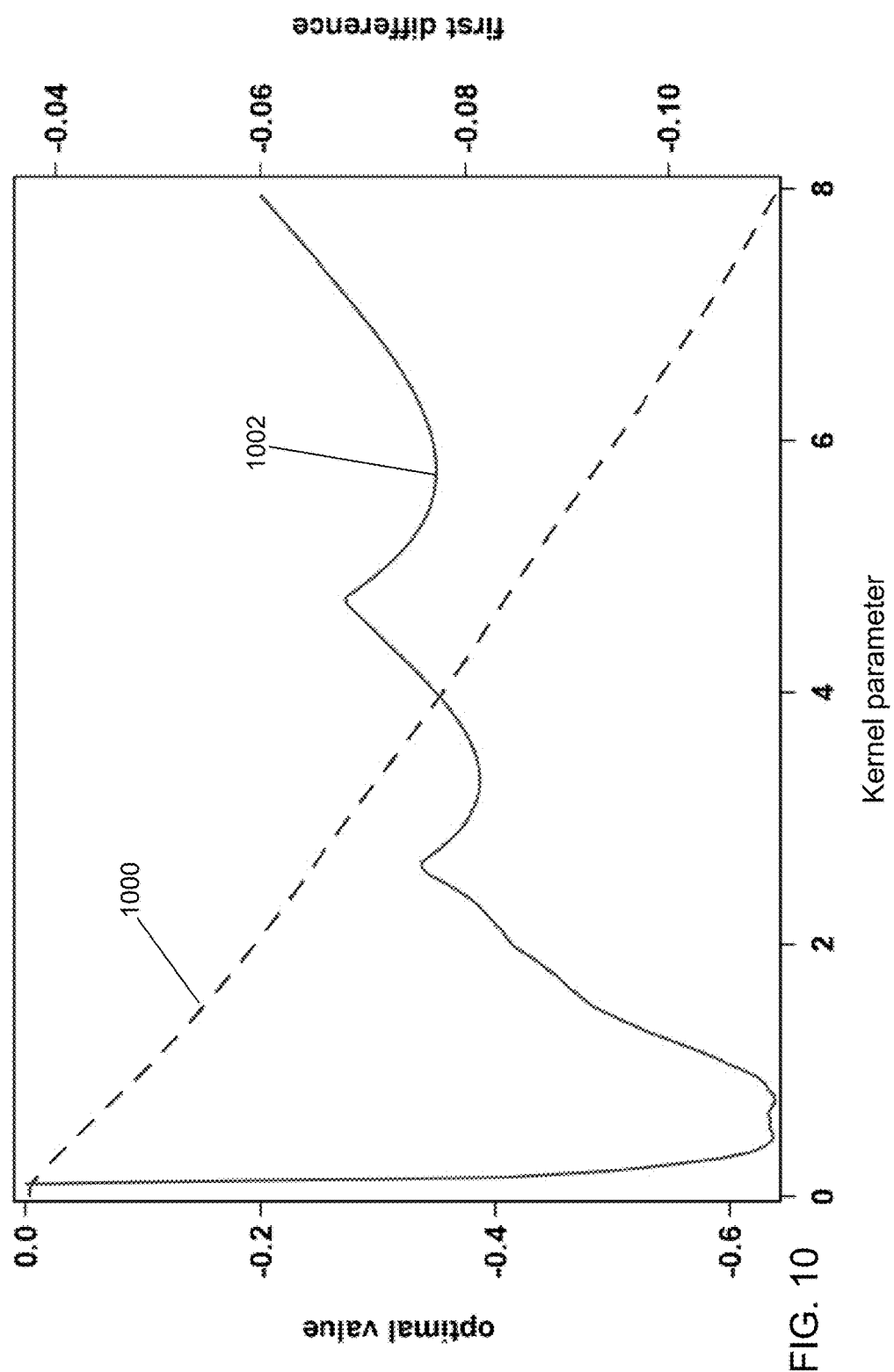
FIG. 10 depicts an optimal value and a first difference between the optimal values as a function of the Gaussian bandwidth parameter value determined using the Gaussian kernel function and the first sample dataset of FIG. 5 in accordance with an illustrative embodiment.

In operation 824, a first derivative of the optimal values computed in operation 816 and stored in operation 818 is computed. For example, the first derivative may be computed using the method of finite differences to compute a first difference value for each value for the kernel parameter. Referring to FIG. 10, for example, an optimal value curve 1000 depicts the optimal values computed in operation 816 as a function of the kernel parameter s using the Gaussian kernel function. A first difference curve 1002 depicts the first derivative of the optimal values computed using the method of finite differences as a function of the kernel parameter.

Figure 11A:
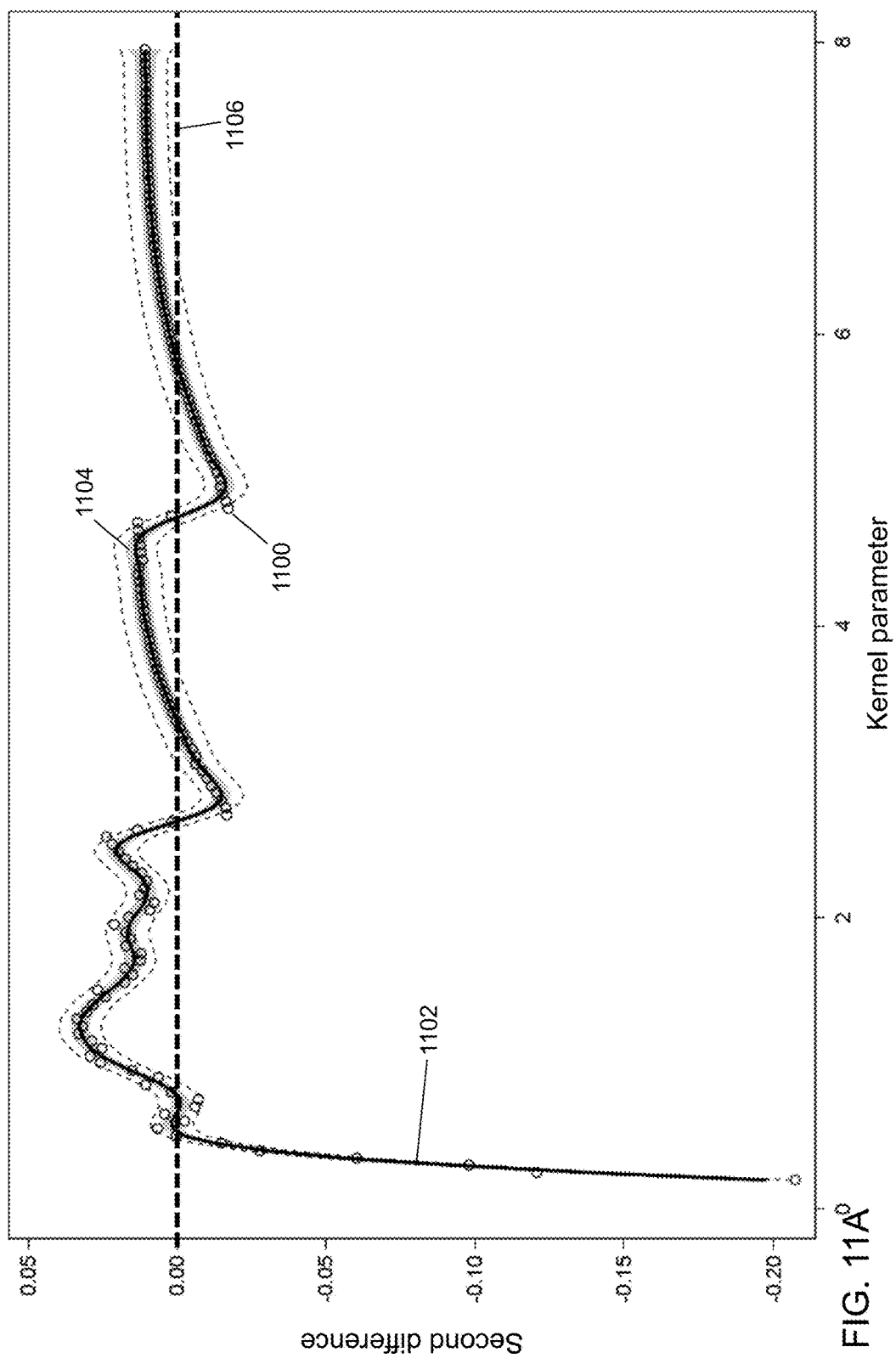
FIG. 11A depicts a second difference between the first difference values of FIG. 10 (a second derivative) as a function of the Gaussian bandwidth parameter value in accordance with an illustrative embodiment.

In an operation 826, a second derivative of the optimal values computed in operation 816 and stored in operation 818 is computed. For example, the second derivative may be computed using the first difference of the optimal values computed in operation 824 using the method of finite differences to compute a second difference value for each kernel parameter value. Referring to FIG. 11A, for example, a second difference curve 1100 depicts the second derivative of the optimal values computed using the method of finite differences as a function of the kernel parameter s using the Gaussian kernel function. The open circles define the data points computed as the second difference curve 1100. A zero crossing line 1106 defines a zero value for the second difference.

Figure 11B:
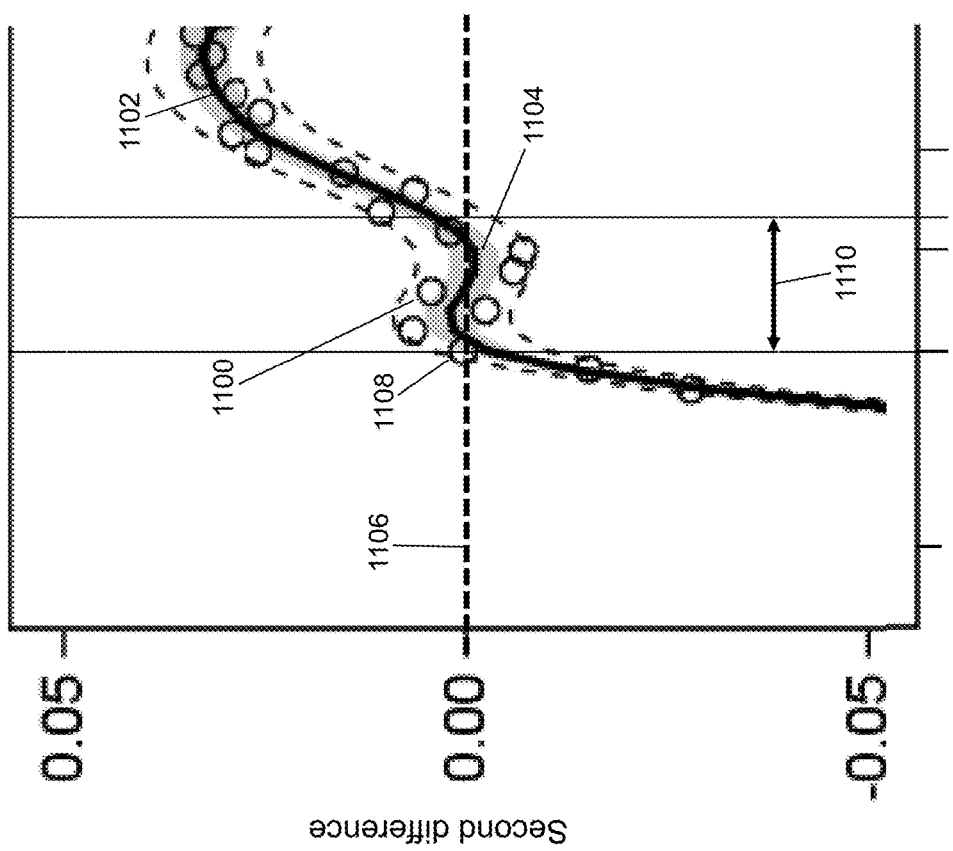
FIG. 11B depicts a zoomed view of a first zero crossing of the second difference of FIG. 11a in accordance with an illustrative embodiment.

In an operation 828, a value of the kernel parameter s at a first zero crossing of the optimal value is determined when the first value in operation 814 was the minimum kernel parameter value. For example, a first data point of the data points that define second difference curve 1100 that crosses zero is identified. Referring to FIG. 11B, for example, a zoomed view of a first zero crossing of the second difference is shown in accordance with an illustrative embodiment. A first zero crossing data point 1108 may be determined at the kernel parameter value s=0.5.

In an alternative embodiment, a curve may be fit to the second derivative of the optimal values to determine the first zero crossing value of the kernel parameter such as s. Referring to FIG. 9, example operations of classification application 122 to determine a curve fit are described.

In an operation 900, a seventh indicator of a curve fit function to apply is received. For example, the seventh indicator indicates a name of a curve fit function. The seventh indicator may be received by classification application 122 after selection from a user interface window or after entry by a user into a user interface window. A default value for the curve fit function may further be stored, for example, in computer-readable medium 108. As an example, a curve fit function may be selected from "None", "Penalized B-spline", etc. Of course, the curve fit function may be labeled or selected in a variety of different manners by the user as understood by a person of skill in the art. In an alternative embodiment, the curve fit function may not be selectable, and a single curve fit function is implemented in classification application 122. For example, a penalized B-spline function may be used by default or without allowing a selection.

In an operation 902, an eighth indicator of a value of a confidence limit is received. In an alternative embodiment, the eighth indicator may not be received. For example, a default value may be stored, for example, in computer-readable medium 108 and used automatically. In another alternative embodiment, the value of the confidence limit may not be selectable. Instead, a fixed, predefined value may be used. If "None", is selected as the curve fit function, no curve fit may be performed, but a confidence limit may be used to define a value that is considered zero (i.e., 1.0e−6 is the value of the confidence limit and is considered approximately zero).

In an operation 904, a curve is fit to the second derivative of the optimal values computed in operation 826 using the curve fit function indicated in operation 900. For illustration, a penalized B-spline can be fit to the second derivative of the optimal values computed in operation 826. If the 95% confidence interval of the fitted value of the second derivative contains zero, the second derivative value is considered zero.

In an operation 906, a value of the kernel parameter at a first zero crossing of the optimal value within the confidence limit is determined using the curve computed in operation 904. For example, successive curve fit values are computed for successive values of the kernel parameter. Successive kernel parameter values may be determined by incrementing a current kernel parameter value with the incremental kernel parameter value. For each successive computation, an upper limit is computed using the confidence limit and the heuristics computed for second derivative curve fit line 1102 at current kernel parameter value, and a lower limit is computed using the confidence limit and the heuristics computed for second derivative curve fit line 1102 at the current kernel parameter value. The kernel parameter value at the first zero crossing is determined when zero is within the computed upper limit and the computed lower limit.

In an operation 908, a value of the kernel parameter at the first zero crossing is defined as a start of an optimal value range for the kernel parameter.

In an operation 910, a value of the kernel parameter at the first zero crossing is defined as an end of an optimal value range for the kernel parameter.

In an operation 911, the current value of the kernel parameter is updated by incrementing the current value using the incremental kernel parameter value.

In an operation 912, a next value of the curve fit is computed using the updated current value for the kernel parameter. Again, an upper limit is computed using the confidence limit and the heuristics computed for second derivative curve fit line 1102 at the updated current value for the kernel parameter, and a lower limit is computed using the confidence limit and the heuristics computed for second derivative curve fit line 1102 at the updated current value for the kernel parameter.

In an operation 914, a determination is made concerning whether or not zero is within the computed upper limit and the computed lower limit for the updated current value. When zero is within the computed upper limit and the computed lower limit for the updated current value, processing continues in an operation 916. When zero is not within the computed upper limit and the computed lower limit for the updated current value, processing continues in an operation 918.

In operation 916, a value of the end of the optimal value range for the kernel parameter is updated with the updated current value for the kernel parameter. Processing continues in operation 911 to evaluate the next value of the curve fit using an updated value for the kernel parameter.

In operation 918, processing is complete for defining a range of values for the kernel parameter as the start and the end of the optimal value range. Processing continues in an operation 830 to evaluate the next value. The range of values may include a single value for the kernel parameter.

Referring again to FIGS. 11A and 11B, a second derivative curve fit line 1102 depicts a curve fit to the second derivative of the optimal objective function values. For illustration, a penalized B-spline curve fit function was used to define second derivative curve fit line 1102. A confidence interval 1104 may define a confidence area about each data point based on the value of the confidence limit and the heuristics computed as part of defining second derivative curve fit line 1102. For illustration, the value of the confidence limit was 95%. A range 1110 of values for the kernel parameter s was defined as the start and the end of the optimal value range based on the confidence limit including zero. The value of the kernel parameter s at the first zero crossing was −0.5 and the value of the kernel parameter s at the last zero crossing was −0.85. Range 1110 from s=0.5 to s=0.85 defines a range of values for kernel parameter s that provide a data boundary that is smooth and captures essential visual features of the data.

From s=0.5 to s=0.85, the second derivative was approximately zero for the first time. Based on a review of FIGS. 6A-6E, value(s) of s between 0.5 and 0.85 provided a data boundary of good quality. The interval [0.5, 0.85] appears to form a set of critical points. To select a single value for the kernel parameter from range 1110, an average can be computed for range 1110 as 0.85−0.5/2+0.5=0.675-0.7 shown in FIG. 6C. This data boundary captures the essential geometric properties of first sample dataset 500 as compared to any other values of s outside the [0.5, 0.85] interval, and this value of s is from the first set of critical points.

Referring again to FIG. 8A, in operation 830, the values stored in operation 818 for the determined kernel parameter value or range of kernel parameter value(s) are identified.

In an operation 832, the identified values are stored, for example, in computer-readable medium 108, as SVDD 126. For example, SVDD 126 includes $SV_{<C}$, $\alpha_i$ for each $SV_{<C}$, $R^2$, the optimal value, and any constant values previously computed and stored for the determined kernel parameter value or range of kernel parameter value(s).

Referring to FIG. 8B, example operations of classification application 122 to use SVDD 126 to classify scoring dataset 128 and create outlier dataset 130 are described. In an operation 840, a ninth indicator is received that indicates scoring dataset 128. For example, the ninth indicator indicates a location and a name of scoring dataset 128. As an example, the ninth indicator may be received by classification application 122 after selection from a user interface window or after entry by a user into a user interface window. In an alternative embodiment, scoring dataset 128 may not be selectable. For example, a most recently created dataset may be used automatically.

In an operation 842, a tenth indicator is received that indicates outlier dataset 130. For example, the tenth indicator indicates a location and a name of outlier dataset 130. As an example, the tenth indicator may be received by classification application 122 after selection from a user interface window or after entry by a user into a user interface window. In an alternative embodiment, outlier dataset 130 may not be selectable. For example, a default name and location for outlier dataset 130 may be used automatically.

In an operation 844, a first observation is selected as z from scoring dataset 128.

In an operation 846, a distance value for z is computed using SVDD 126 as $dist^2(z) = K(z,z) - 2\sum_{i=1}^{n} \alpha_i K(x_i, z) + \alpha_i \alpha_j K(x_i, x_j)$. As discussed previously, some of the values may be constant and may have been saved with SVDD 126.

In an operation 848, a determination is made concerning whether or not $dist^2(z) > R^2$, where $R^2$ is computed for the selected value for the kernel parameter. When $dist^2(z) > R^2$, processing continues in an operation 850. When $dist^2(z) \leq R^2$, processing continues in an operation 852.

In operation 850, z is stored to outlier dataset 130, and processing continue in operation 852.

In operation 852, a determination is made concerning whether or not scoring dataset 128 includes another observation. When scoring dataset 128 includes another observation, processing continues in an operation 854. When scoring dataset 128 does not include another observation, processing continues in an operation 856.

In operation 854, a next observation is selected as z from scoring dataset 128, and processing continues in operation 846 to determine if the next observation is an outlier.

In operation 856, scoring results are output. For example, statistical results associated with the scoring may be stored on one or more devices and/or on computer-readable medium 108 in a variety of formats as understood by a person of skill in the art. Outlier dataset 130 and/or the scoring results further may be output to display 116, to printer 120, etc. In an illustrative embodiment, an alert message may be sent to another device using communication interface 106, printed on printer 120 or another printer, presented visually on display 116 or another display, presented audibly using speaker 118 or another speaker when an outlier is identified.

The operations of FIGS. 8A, 8B, and 9 may be distributed between one or more applications that are integrated or that are independent. The operations of FIGS. 8A, 8B, and 9 further may be performed using different devices. For example, a first computing device may compute SVDD 126, and a second computing device may determine outlier dataset 130 using the computed SVDD 126.

For comparison, a coefficient variation (CV) method was used to determine a value of kernel parameter s using first sample dataset 500. To select the value of kernel parameter s, the CV method maximizes a coefficient of variation of the kernel matrix as $$CV = \frac{\text{Var}}{\text{Mean} + \epsilon}$$

where Var is a variance of the non-diagonal entries of the kernel matrix, Mean is a mean of the non-diagonal entries of the kernel matrix, and E is a small value to protect against division by zero or round-off error. Setting $\epsilon = 0.000001$, the value of kernel parameter s was determined to be 0.5 using the CV method. The results for s=0.5 are shown in FIG. 6B.

Figure 12:
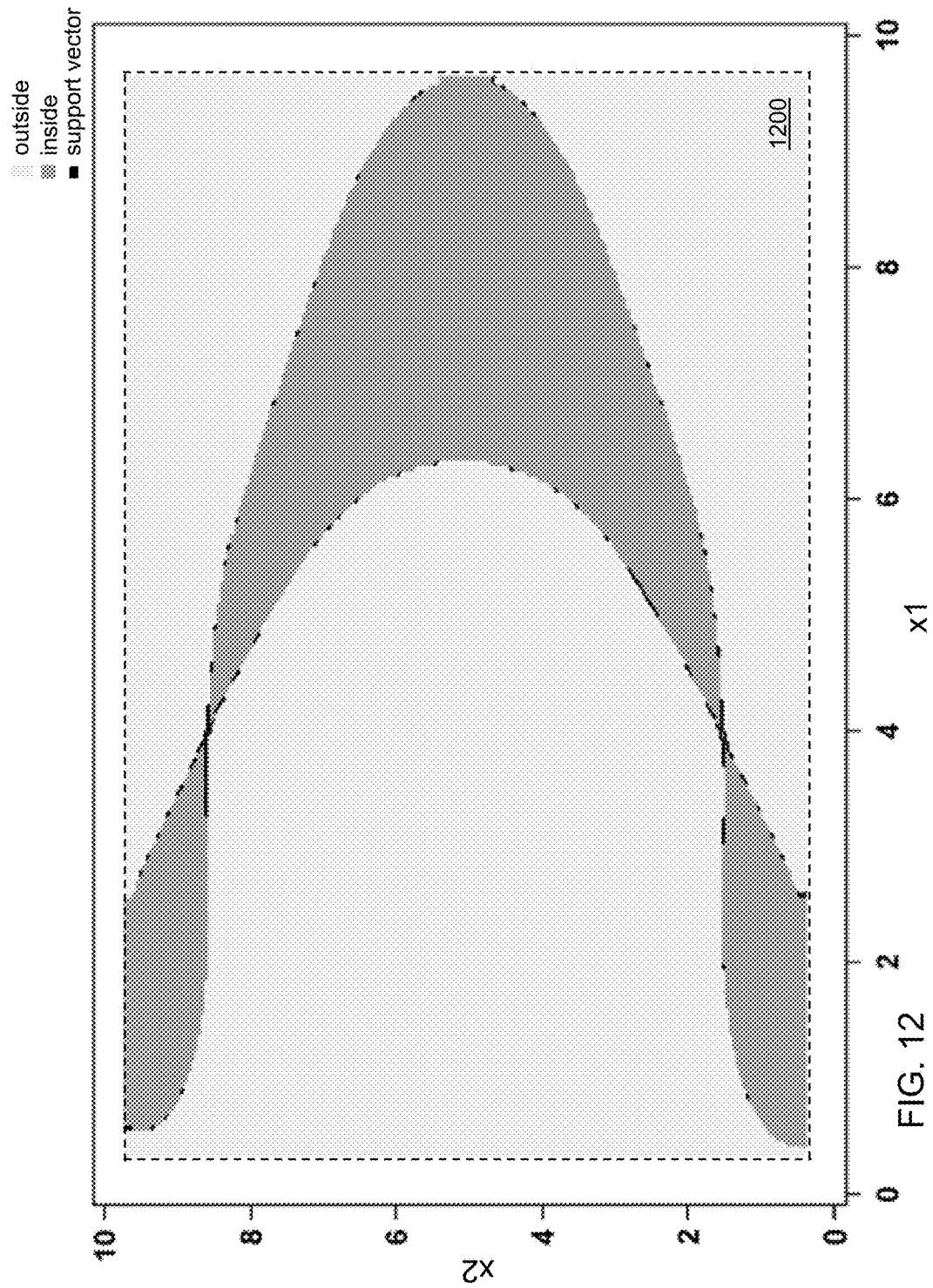
FIG. 12 depicts SVDD results using the Gaussian kernel function and the first sample dataset of FIG. 5 at an optimum Gaussian bandwidth parameter value of 2.4 determined by a distance to a farthest neighbor (DFN) method in accordance with an illustrative embodiment.

As another comparison, a distance to the farthest neighbor (DFN) method was used to determine a value of kernel parameter s using first sample dataset 500. The optimal value of kernel parameter s using the DFN method is computed by maximizing the following objective function $$f_0(s) = \frac{2}{n}\sum_{i=1}^{n} \max_{j \neq i} k(x_i, x_j) - \frac{2}{n}\sum_{i=1}^{n} \min_j k(x_i, x_j)$$

where $k(x_i,x_j)$ is a kernel distance between observations i and j. The value of kernel parameter s was determined to be 2.4 using the DFN method. Referring to FIG. 12, a SVDD 1200 obtained using the DFN method is shown for s=2.4 after optimizing the objective function. A black dot indicates a support vector (boundary position), a dark gray dot indicates an inside data point, and a light gray dot indicates an outside data point based on a mathematical description of DFN SVDD 1200.

Figure 13:
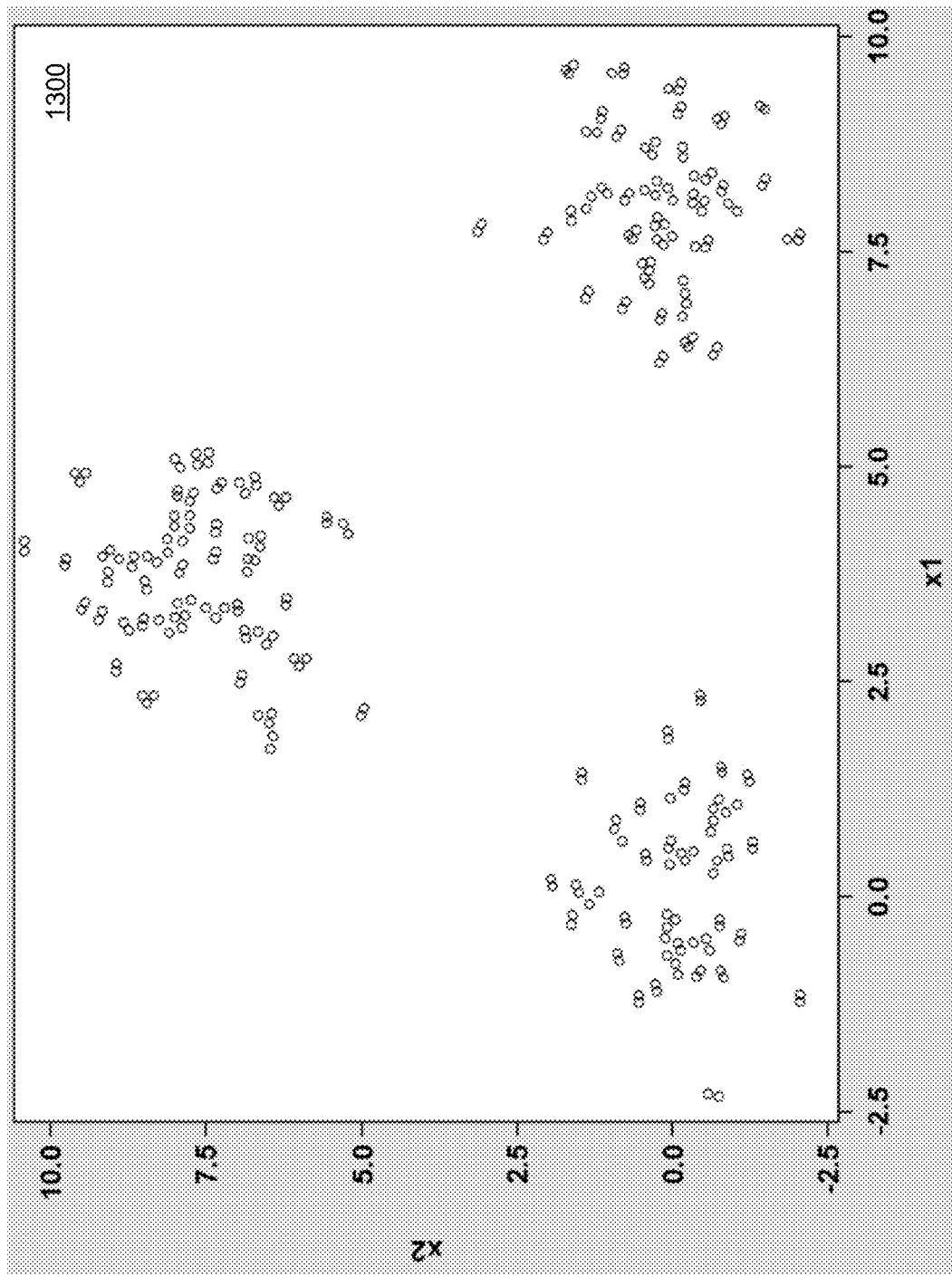
FIG. 13 depicts a second sample dataset including three distinct clusters in accordance with an illustrative embodiment.

Referring to FIG. 13, a second sample dataset 1300 including a first dimension x1 and a second dimension x2 having three distinct clusters is shown for training dataset 124 in accordance with an illustrative embodiment.

Figure 14A:
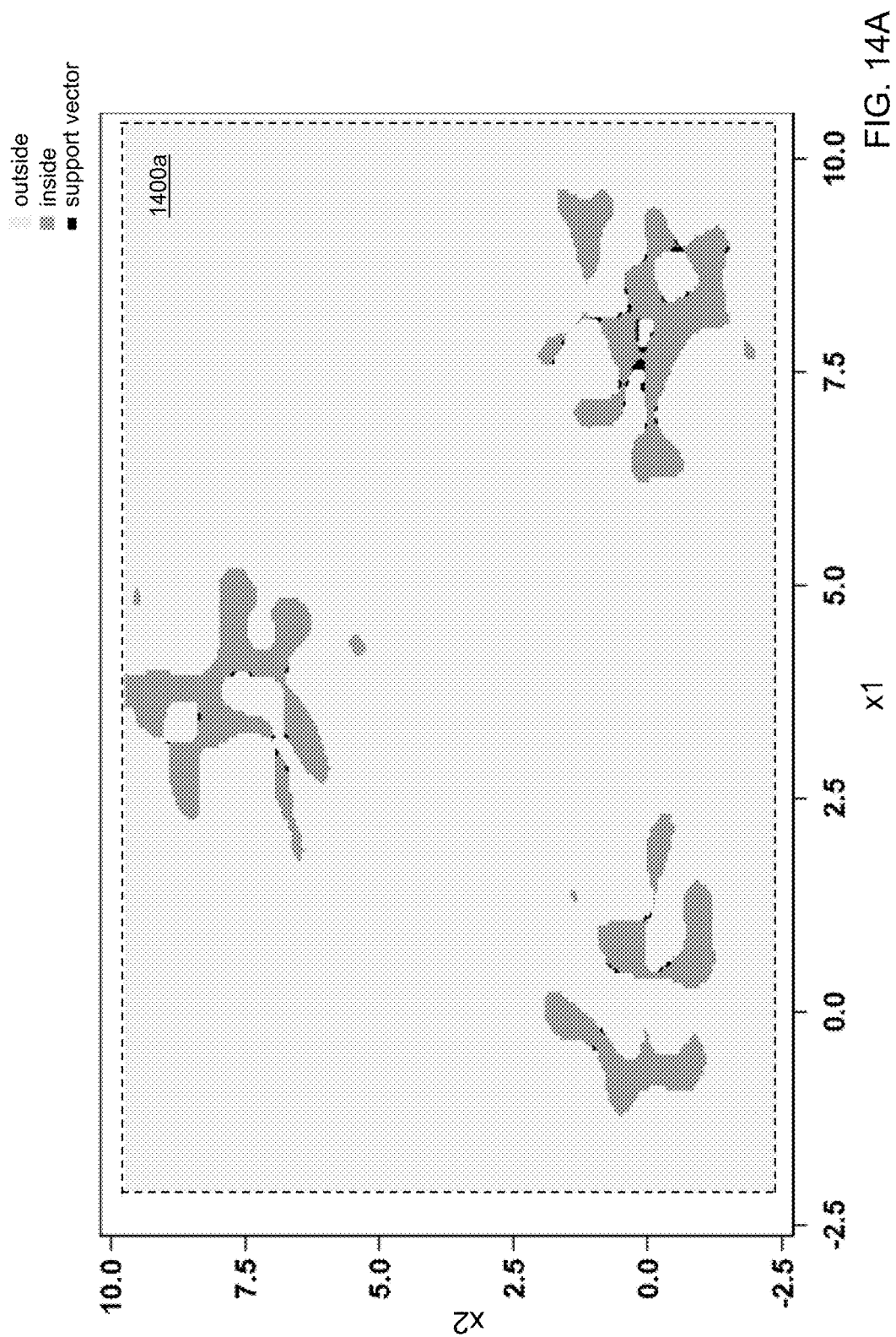
FIGS. 14A to 14D depict SVDD results using the Gaussian kernel function, different Gaussian bandwidth parameter values, and the second sample dataset of FIG. 13 in accordance with an illustrative embodiment.

Referring to FIGS. 14A-14D, variations in SVDD determined for second sample dataset 1300 by optimizing the objective function using the Gaussian kernel function and different values for the kernel parameter s is shown. For each SVDD determination shown in FIGS. 14A-14D, f=0.001 was used. Referring to FIG. 14A, a first SVDD 1400*a* is shown for s=0.4 after optimizing the objective function. A black dot indicates a support vector (boundary position), a dark gray dot indicates an inside data point, and a light gray dot indicates an outside data point based on a mathematical description of first SVDD 1400*a*.

Figure 14B:
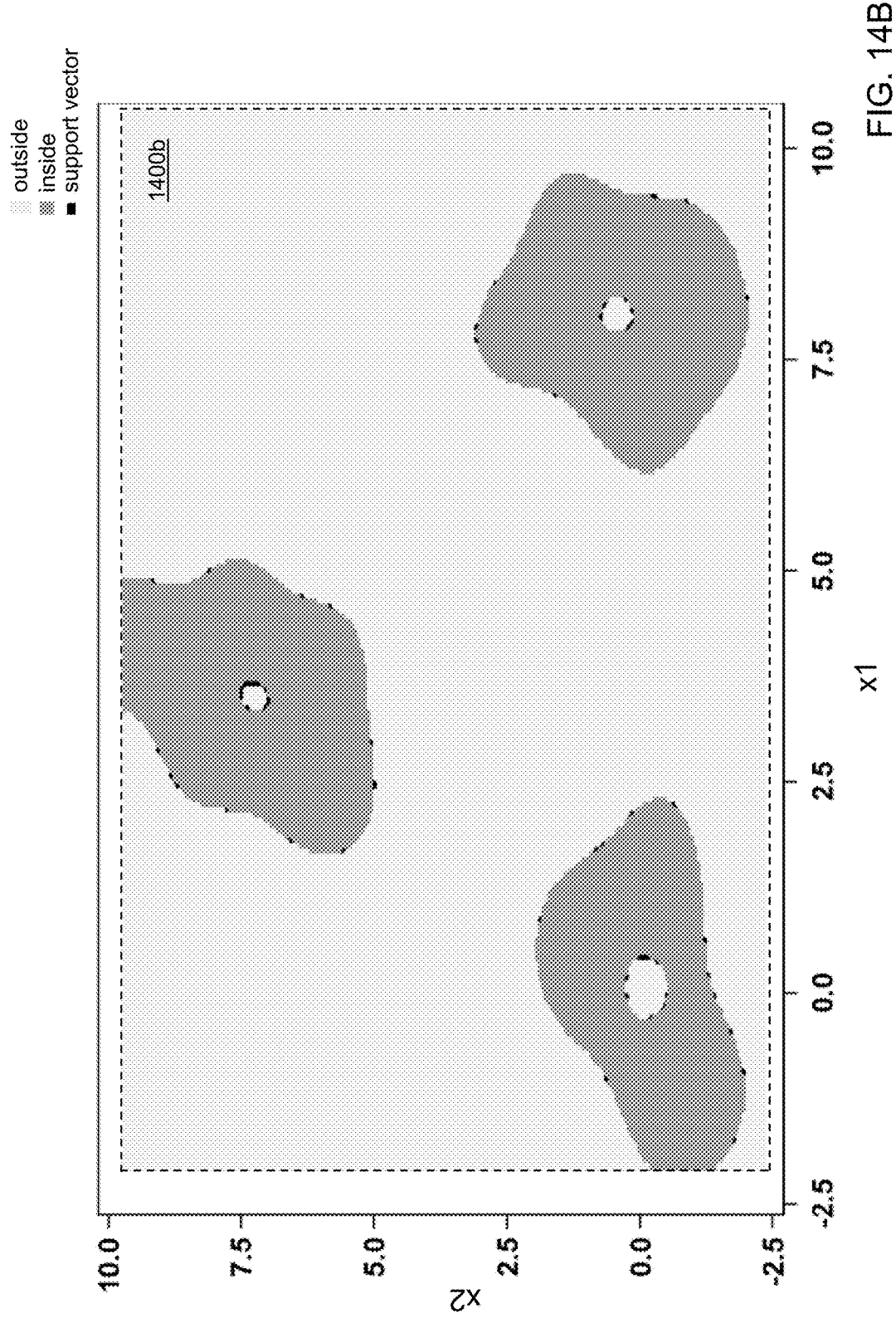

Referring to FIG. 14B, a second SVDD 1400*b* is shown for s=1.1 after optimizing the objective function. A black dot indicates a support vector (boundary position), a dark gray dot indicates an inside data point, and a light gray dot indicates an outside data point based on a mathematical description of second SVDD 1400*b*.

Figure 14C:
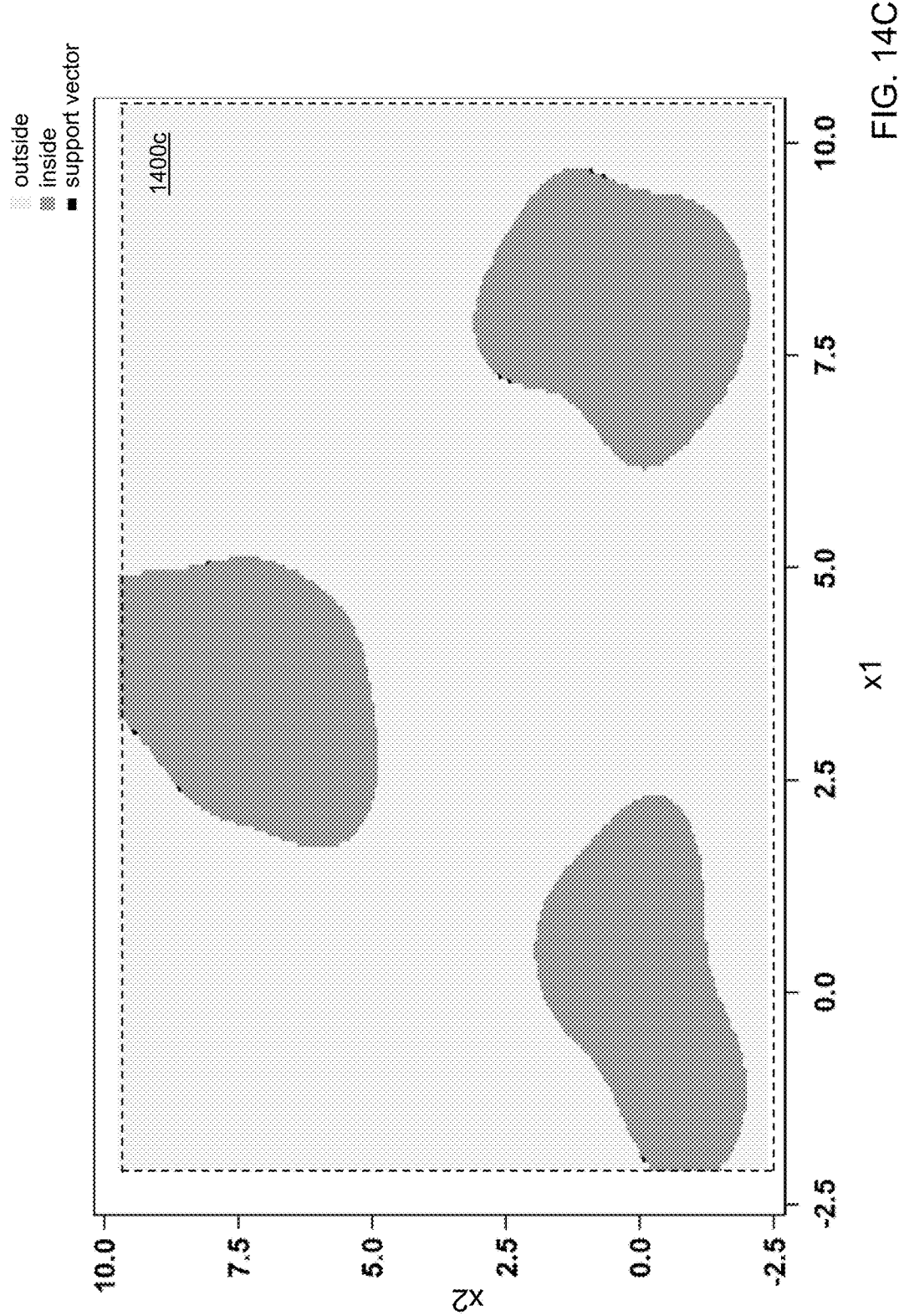

Referring to FIG. 14C, a third SVDD 1400*c* is shown for s=1.3 after optimizing the objective function. A black dot indicates a support vector (boundary position), a dark gray dot indicates an inside data point, and a light gray dot indicates an outside data point based on a mathematical description of third SVDD 1400*c*.

Figure 14D:
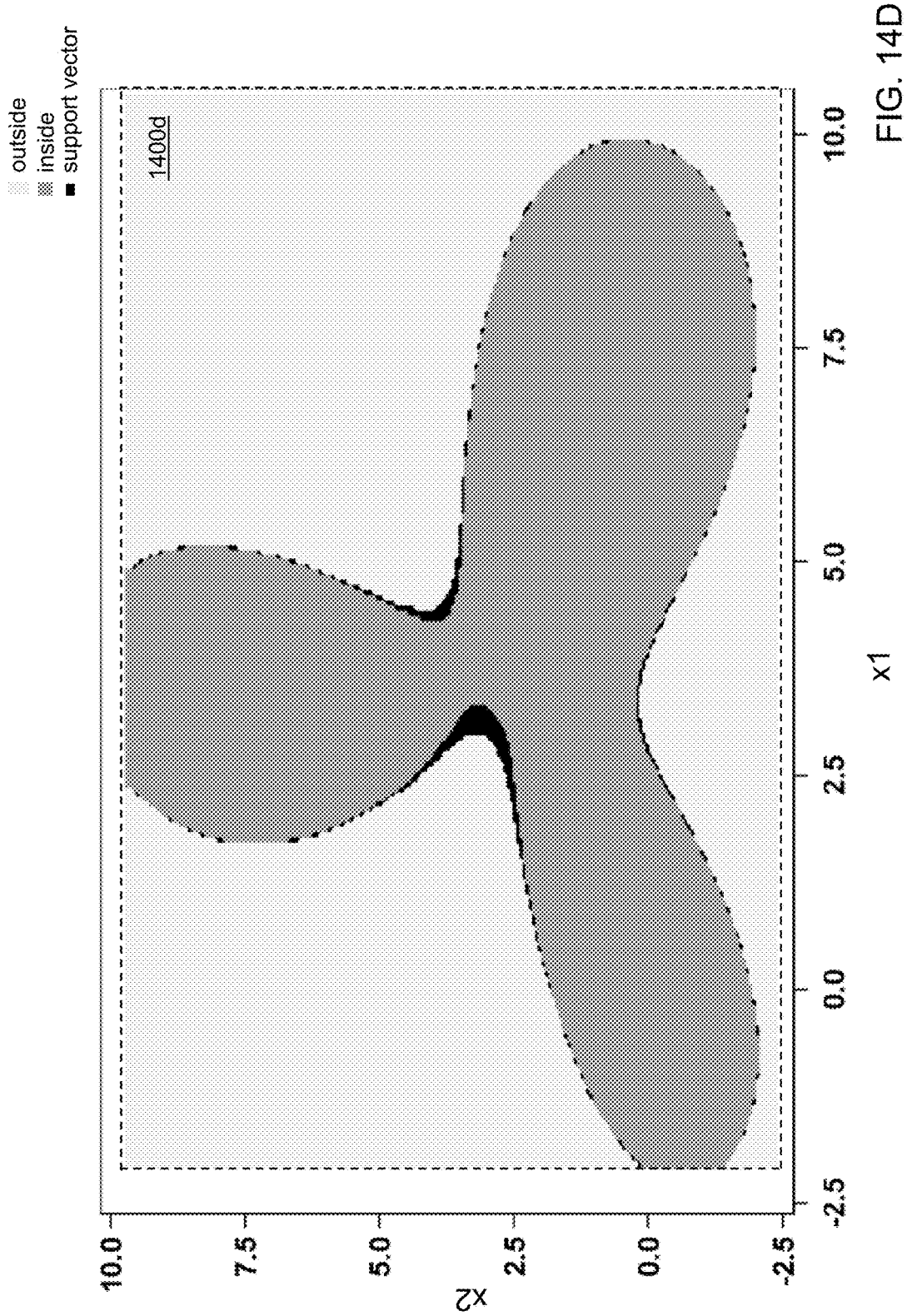

Referring to FIG. 14D, a fourth SVDD 1400*d* is shown for s=3.5 after optimizing the objective function. A black dot indicates a support vector (boundary position), a dark gray dot indicates an inside data point, and a light gray dot indicates an outside data point based on a mathematical description of fourth SVDD 1400*d*.

Figure 15:
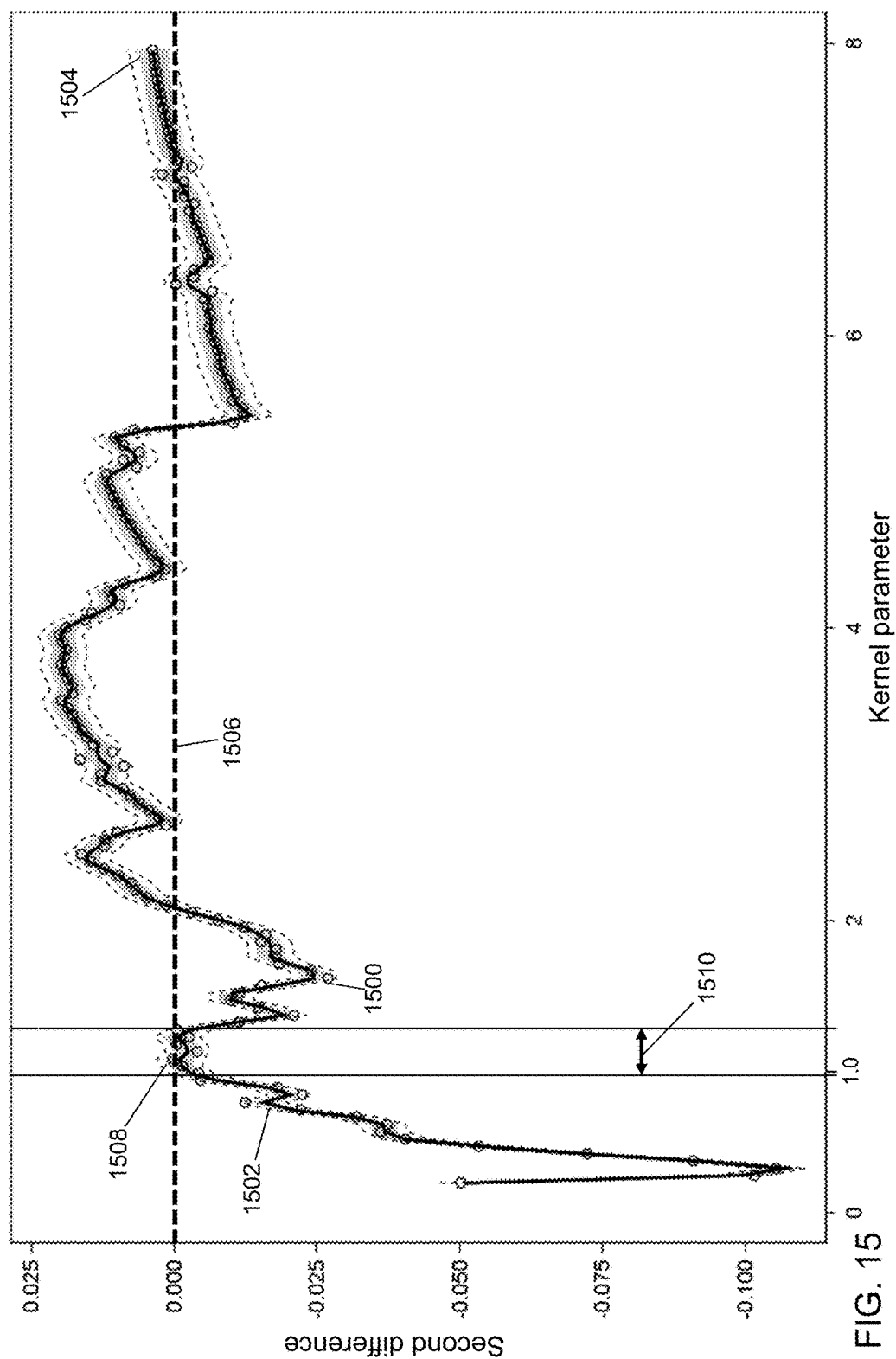
FIG. 15 depicts a second difference as a function of the Gaussian bandwidth parameter value computed using the Gaussian kernel function and the second sample dataset of FIG. 13 in accordance with an illustrative embodiment.

Referring to FIG. 15, a second difference curve 1500 depicts the second derivative of the optimal values computed using the method of finite differences as a function of the kernel parameter s for the second sample dataset 1300. The open circles define the data points computed as the second difference curve 1500. A zero crossing line 1506 defines a zero value for the second difference. A first zero crossing data point 1508 may be determined for the kernel parameter value s=1.1.

A second derivative curve fit line 1502 depicts a curve fit to the second derivative of the optimal values. For illustration, a penalized B-spline curve fit function was used to define second derivative curve fit line 1502. A confidence interval 1504 may define a confidence area about each data point based on the value of the confidence limit and the heuristics computed as part of defining second derivative curve fit line 1502. For illustration, the value of the confidence limit was 95%. A range 1510 of values for the kernel parameter s was defined as the start and the end of the optimal value range based on the confidence limit including zero. The value of the kernel parameter s at the first zero crossing was ~0.95 and the value of the kernel parameter s at the last zero crossing was ~1.25. Range 1510 from s=0.95 to s=1.25 defines a range of values for kernel parameter s that provide a data boundary that is smooth and captures essential visual features of the data.

From s=0.95 to s=1.25, the second derivative was approximately zero for the first time. Based on a review of FIGS. 14A-14D, value(s) of s between 0.95 and 1.25 provided a data boundary of good quality. The interval [0.95, 1.25] appears to form a set of critical points. The data boundary using s=1.1 (the average of the interval [0.95, 1.25]) is shown in FIG. 14B. This data boundary captures the essential geometric properties of second sample dataset 1300 as compared to any other values of s outside the [0.95, 1.25] interval and this value of s is from the first set of critical points.

Figure 16A:
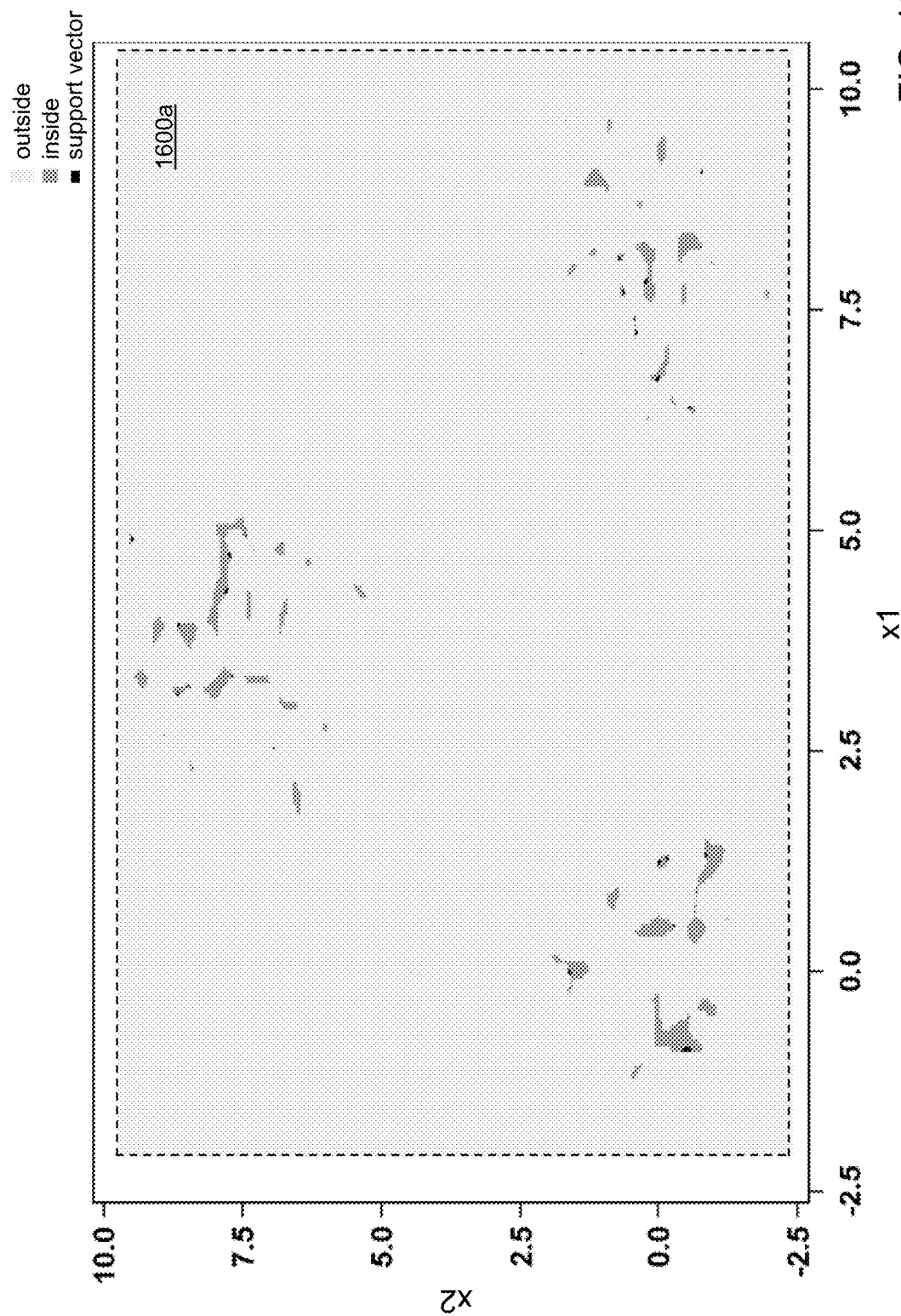
FIG. 16A depicts SVDD results using the Gaussian kernel function and the second sample dataset of FIG. 13 at an optimum Gaussian bandwidth parameter value of 0.2 determined by a coefficient of variation (CV) method in accordance with an illustrative embodiment.

For example, referring to FIG. 16A, an SVDD 1600*a* obtained using the CV method is shown for s=0.2 after optimizing the objective function for second sample dataset 1300 using the Gaussian kernel function. A black dot indicates a support vector (boundary position), a dark gray dot indicates an inside data point, and a light gray dot indicates an outside data point based on a mathematical description of SVDD 1600*a*.

Figure 16B:
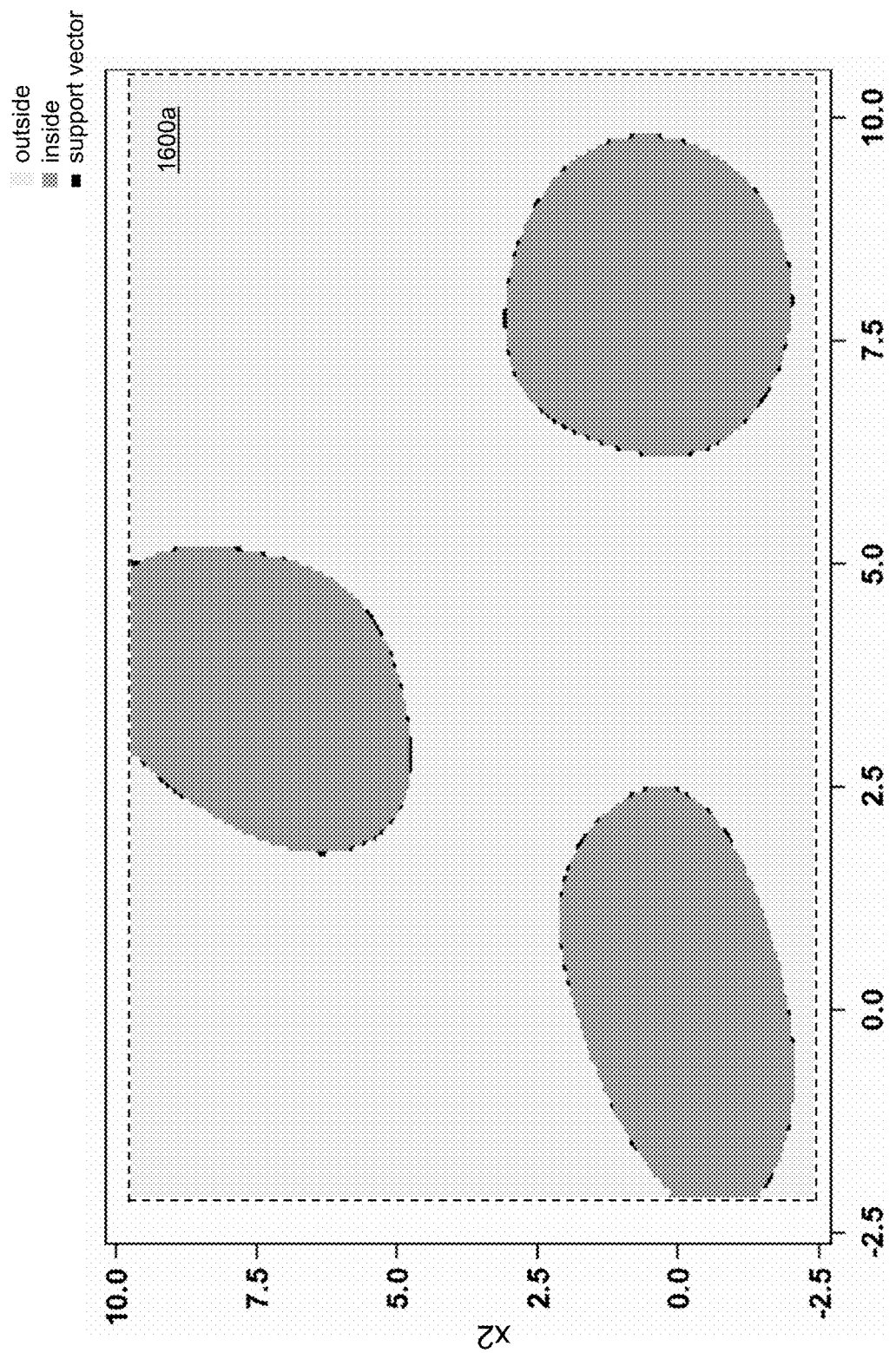
FIG. 16B depicts SVDD results using the Gaussian kernel function and the second sample dataset of FIG. 13 at an optimum Gaussian bandwidth parameter value of 2.5 determined by the DFN method in accordance with an illustrative embodiment.

As another example, referring to FIG. 16B, an SVDD 1600*b* obtained using the DFN method is shown for s=2.5 after optimizing the objective function for second sample dataset 1300 using the Gaussian kernel function. A black dot indicates a support vector (boundary position), a dark gray dot indicates an inside data point, and a light gray dot indicates an outside data point based on a mathematical description of SVDD 1600*b*.

Figure 17:
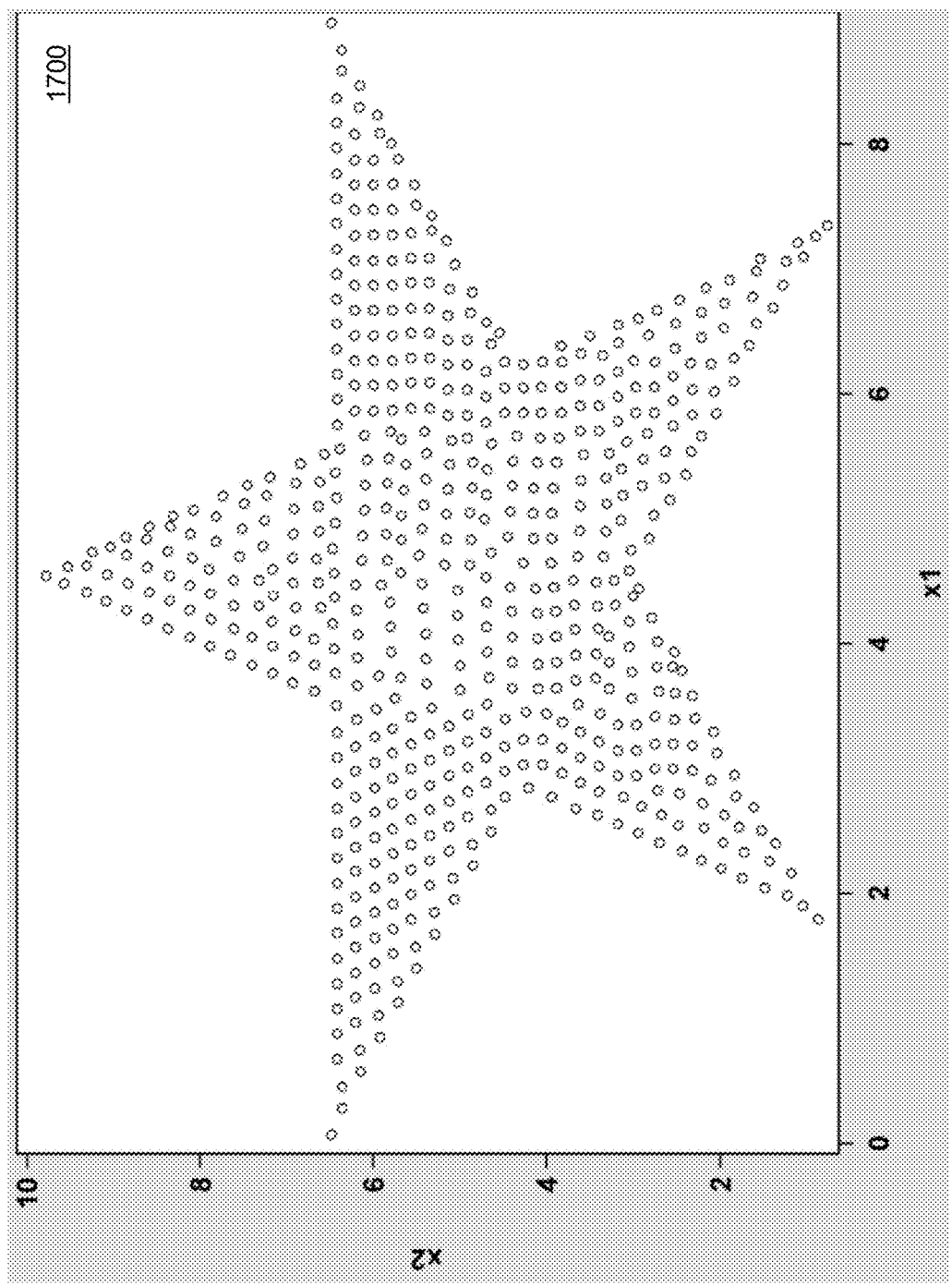
FIG. 17 depicts a third sample dataset having a star shape in accordance with an illustrative embodiment.

Referring to FIG. 17, a third sample dataset 1700 including a first dimension x1 and a second dimension x2 having a star shape is shown for training dataset 124 in accordance with an illustrative embodiment.

Figure 18A:
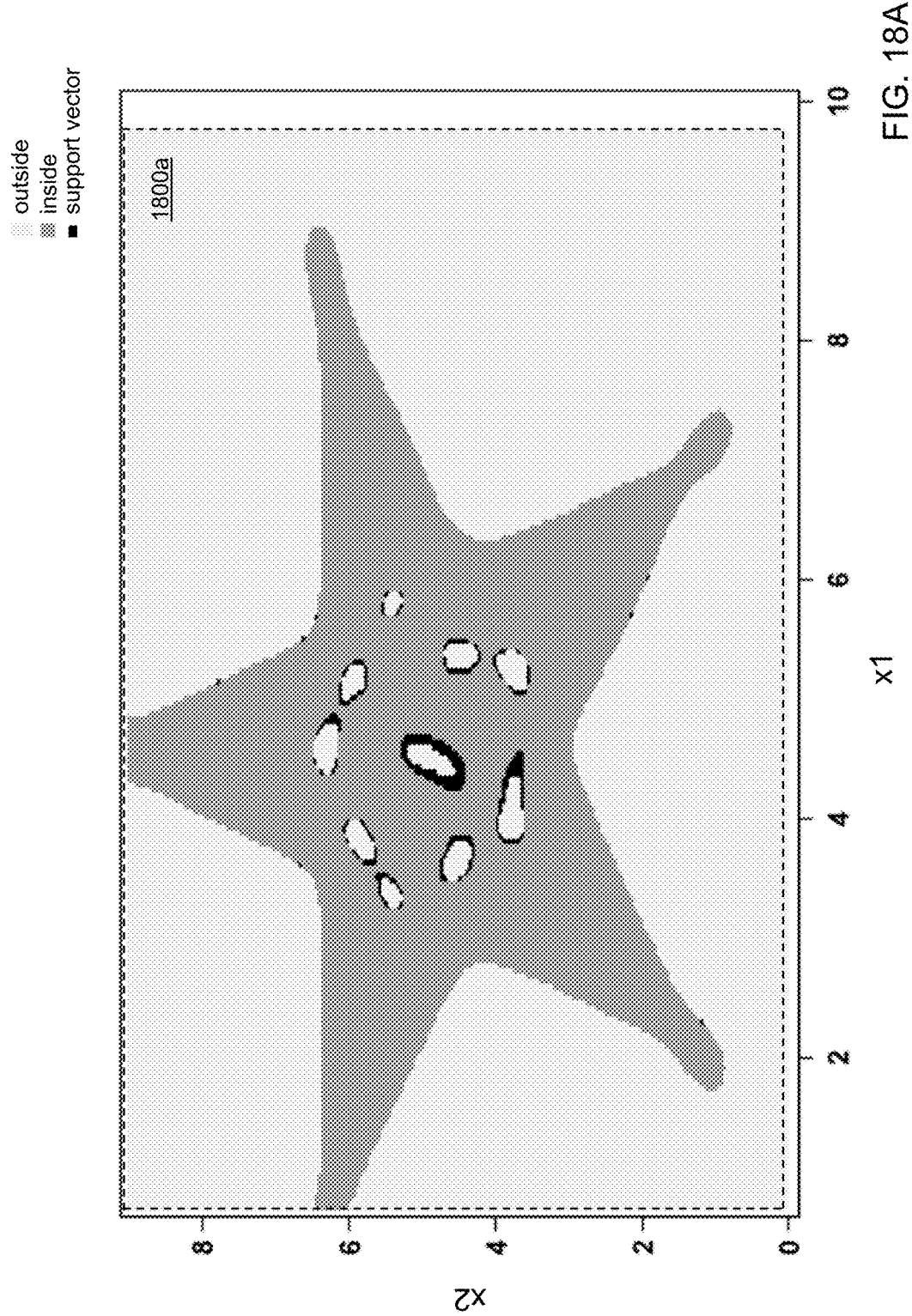
FIGS. 18A to 18C depict SVDD results using the Gaussian kernel function, different Gaussian bandwidth parameter values, and the third sample dataset of FIG. 17 in accordance with an illustrative embodiment.
Figure 18B:
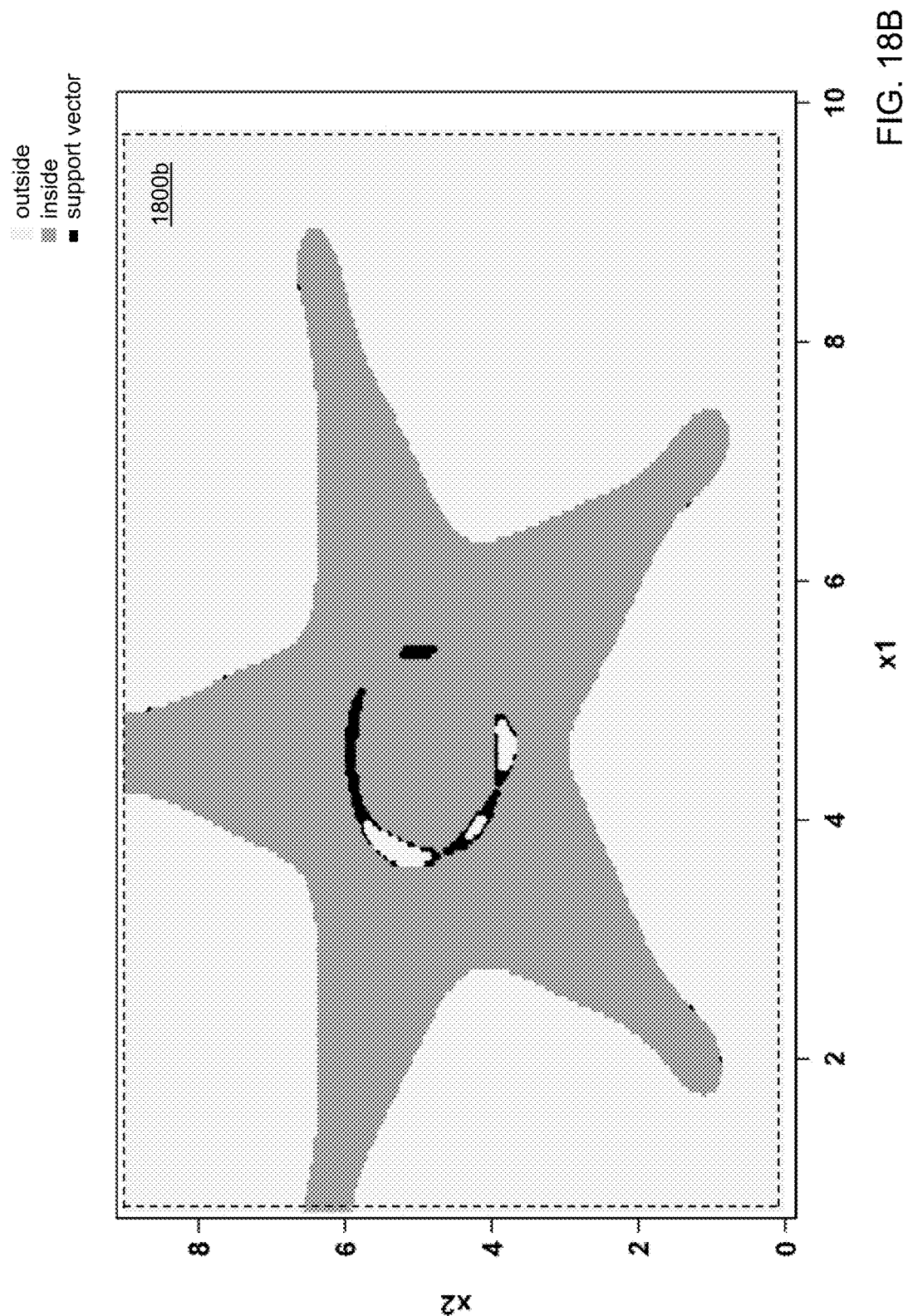
Figure 18C:
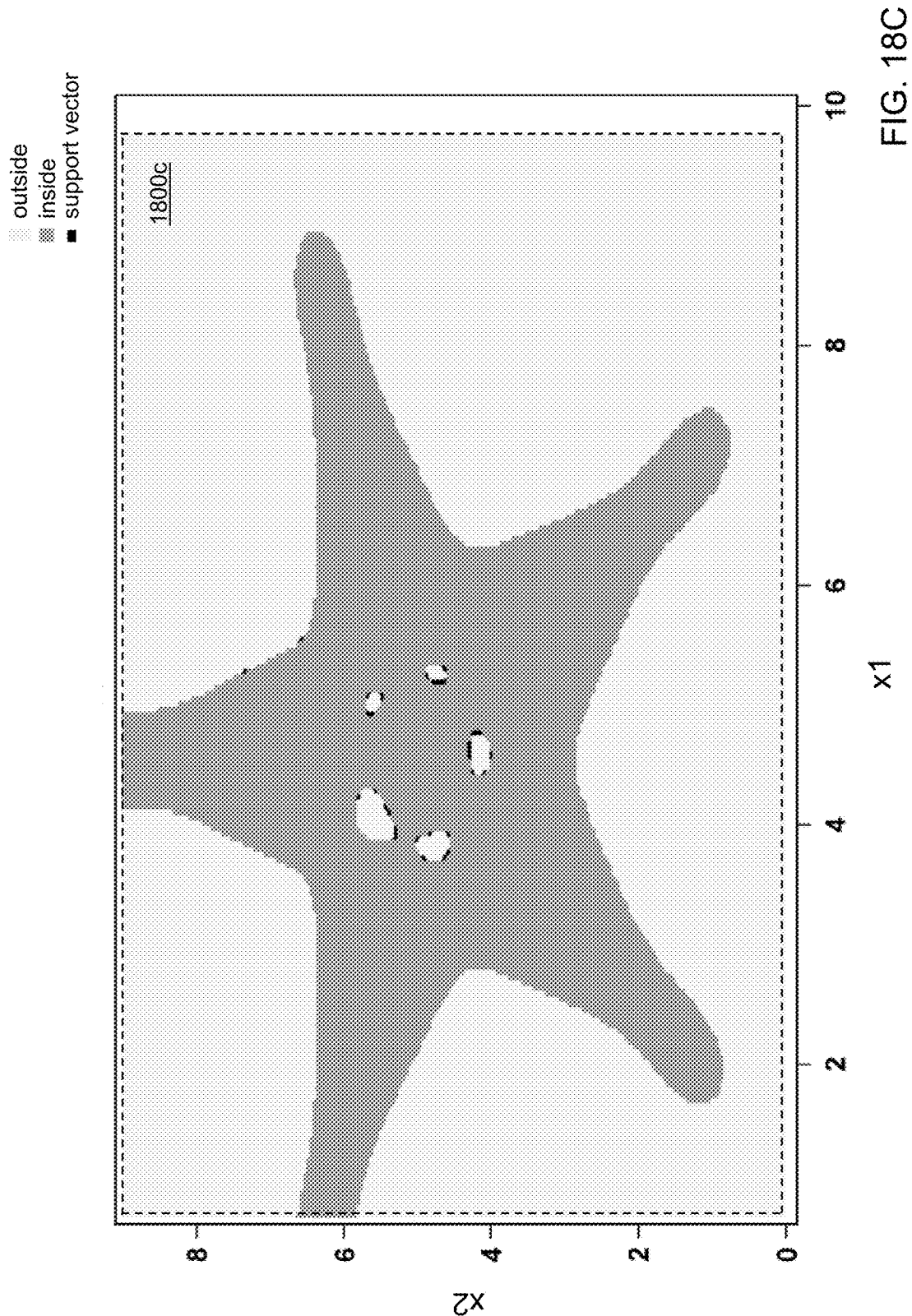

Referring to FIGS. 18A-18C, variations in SVDD determined for third sample dataset 1700 by optimizing the objective function using the Gaussian kernel function and different values for the kernel parameter s is shown. For each SVDD determination shown in FIGS. 18A-18C, f=0.001 was used. Referring to FIG. 18A, a first SVDD 1800*a* is shown for s=0.7 after optimizing the objective function. A black dot indicates a support vector (boundary position), a dark gray dot indicates an inside data point, and a light gray dot indicates an outside data point based on a mathematical description of first SVDD 1800*a*.

Referring to FIG. 18B, a second SVDD 1800*b* is shown for s=0.9 after optimizing the objective function. A black dot indicates a support vector (boundary position), a dark gray dot indicates an inside data point, and a light gray dot indicates an outside data point based on a mathematical description of second SVDD 1800*b*.

Referring to FIG. 18C, a third SVDD 1800*c* is shown for s=1.1 after optimizing the objective function. A black dot indicates a support vector (boundary position), a dark gray dot indicates an inside data point, and a light gray dot indicates an outside data point based on a mathematical description of third SVDD 1800*c*.

Figure 19:
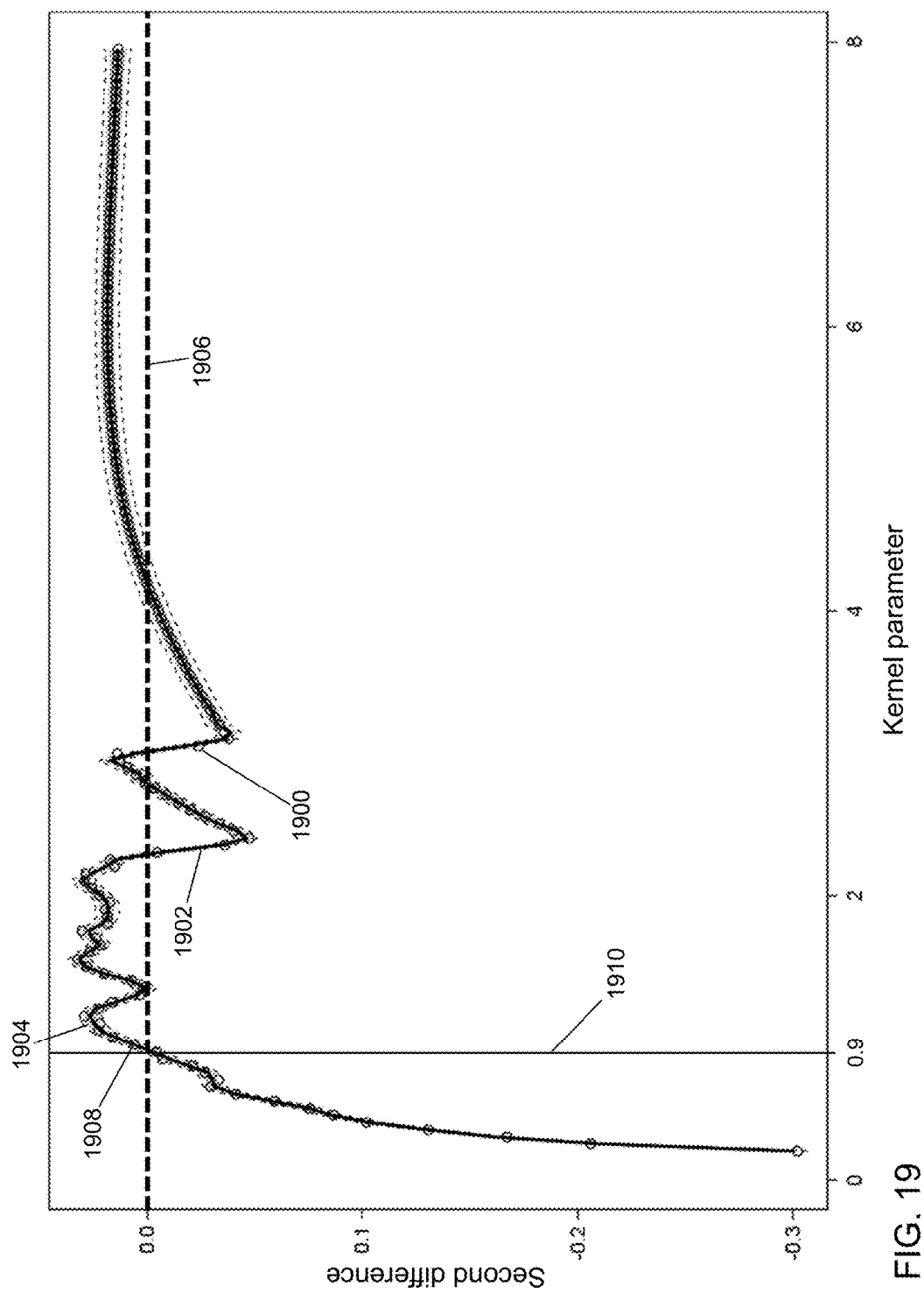
FIG. 19 depicts a second difference as a function of the Gaussian bandwidth parameter value computed using the Gaussian kernel function and the third sample dataset of FIG. 17 in accordance with an illustrative embodiment.

Referring to FIG. 19, a third difference curve 1900 depicts the second derivative of the optimal values computed using the method of finite differences as a function of the kernel parameter s for the third sample dataset 1700. The open circles define the data points computed as the third difference curve 1900. A zero crossing line 1906 defines a zero value for the second difference. A first zero crossing data point 1908 may be determined for the kernel parameter value s=~1.

A second derivative curve fit line 1902 depicts a curve fit to the second derivative of the optimal values. For illustration, a penalized B-spline curve fit function was used to define second derivative curve fit line 1902. A confidence interval 1904 may define a confidence area about each data point based on the value of the confidence limit and the heuristics computed as part of defining second derivative curve fit line 1902. For illustration, the value of the confidence limit was 95%. A range 1910 of values for the kernel parameter s was defined as 0.9, which was the start and the end of the optimal value range based on the confidence limit including zero.

Based on a review of FIGS. 18A-18C, the value of s of 0.9 shown in FIG. 18B provided a data boundary of good quality. This data boundary captures the essential geometric properties of third sample dataset 1700 as compared to any other values of s.

Figure 20A:
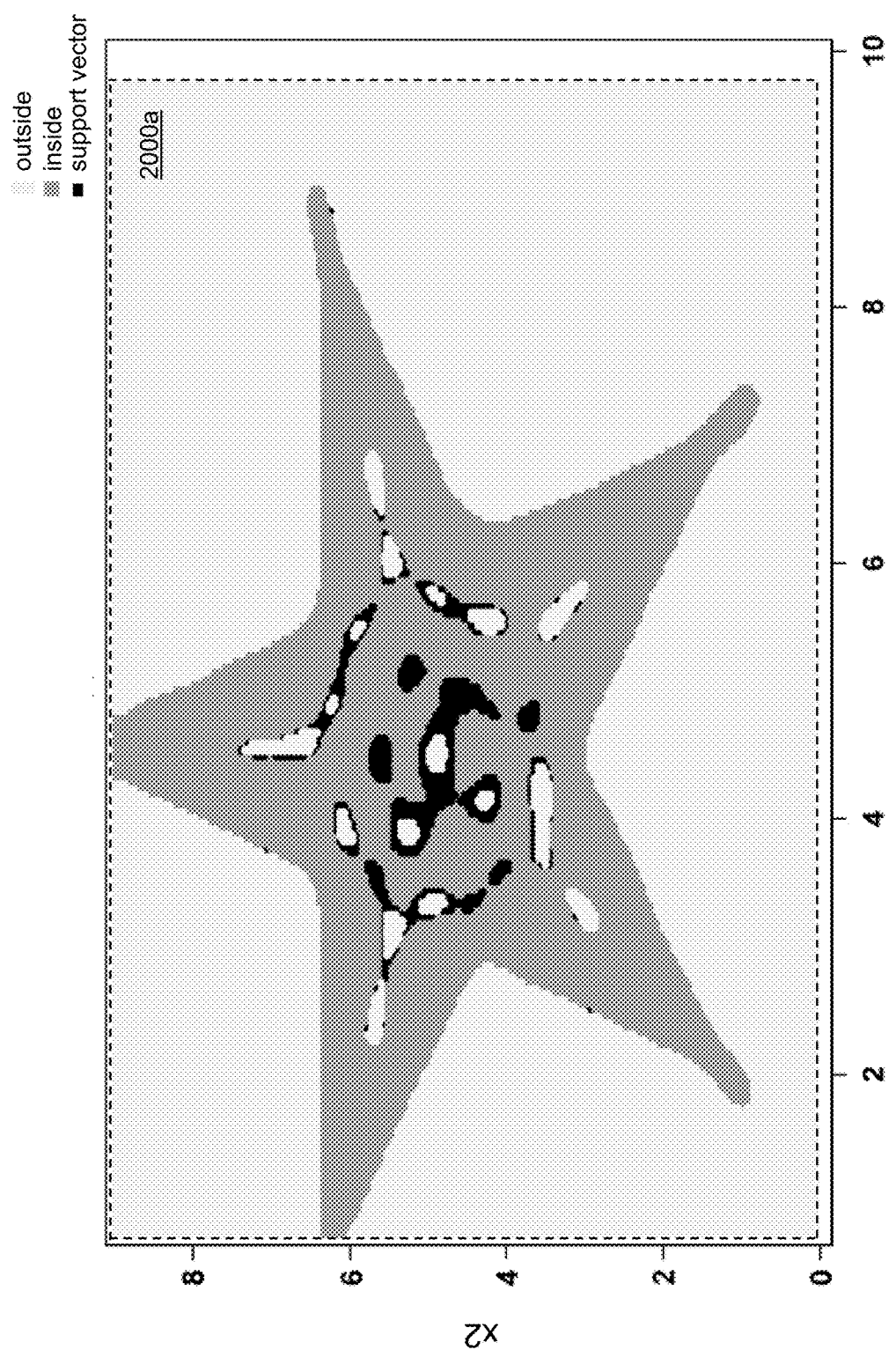
FIG. 20A depicts SVDD results using the Gaussian kernel function and the third sample dataset of FIG. 17 at an optimum Gaussian bandwidth parameter value of 0.5 determined by the CV method in accordance with an illustrative embodiment.

For example, referring to FIG. 20A, an SVDD 2000a obtained using the CV method is shown for s=0.20 for third sample dataset 1700 after optimizing the objective function using the Gaussian kernel function. A black dot indicates a support vector (boundary position), a dark gray dot indicates an inside data point, and a light gray dot indicates an outside data point based on a mathematical description of SVDD 2000a.

Figure 20B:
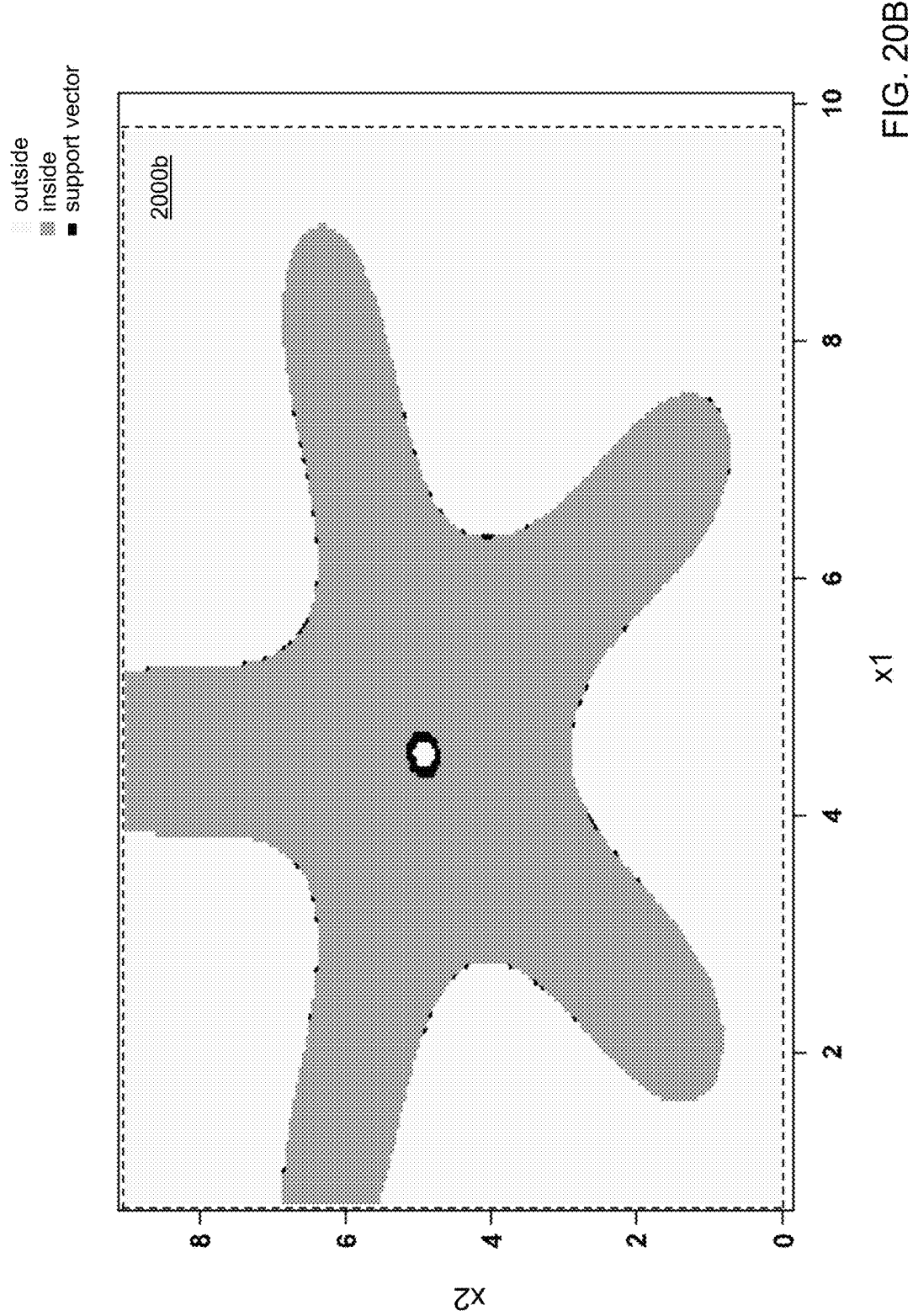
FIG. 20B depicts SVDD results using the Gaussian kernel function and the third sample dataset of FIG. 17 at an optimum Gaussian bandwidth parameter value of 1.7 determined by the DFN method in accordance with an illustrative embodiment.

As another example, referring to FIG. 20B, an SVDD 2000b obtained using the DFN method is shown for s=1.7 for third sample dataset 1700 after optimizing the objective function using the Gaussian kernel function. A black dot indicates a support vector (boundary position), a dark gray dot indicates an inside data point, and a light gray dot indicates an outside data point based on a mathematical description of SVDD 2000b.

Classification application 122 executes a criterion for selecting the value of the kernel parameter for a kernel function such as the Gaussian kernel bandwidth parameter for the Gaussian kernel function. A good quality data boundary that closely follows the data shape can be obtained at values of the kernel parameter s where the second derivative of the optimal dual objective function value with respect to s first reaches zero. For some datasets, classification application 122 provides a range of values where the criterion provides a good quality boundary. Any value of s within this range provides a good data boundary. Starting with a low value of s, the search for a good value of s can be abandoned once the second derivative of the optimal objective function reaches zero. For example, instead of a loop between operations 816-822, a loop may be defined between operations 816-826 and processing stopped when the second derivative of the optimized objective function reaches zero. A current optimal value and value of the kernel parameter s is compared to a previous optimal value to compute the differences.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   read a plurality of data points from a training dataset;
   select a plurality of values for a kernel parameter used by a kernel function;
   for each of the selected plurality of values for the kernel parameter, compute an optimal value of an objective function defined for a support vector data description (SVDD) model using the kernel function, the read plurality of data points, and a respective value for the kernel parameter to define a plurality of sets of support vectors, where each set of support vectors defines a boundary for the read plurality of data points in association with the respective value for the kernel parameter;
   for each of the selected plurality of values for the kernel parameter, store the computed optimal value and the defined set of support vectors in association with the respective value for the kernel parameter;
   compute a plurality of first derivative values for the objective function as a difference between the computed optimal values associated with successive values for the kernel parameter;
   compute a plurality of second derivative values for the objective function as a difference between the computed plurality of first derivative values associated with successive values for the kernel parameter;
   select a value for the kernel parameter where the computed plurality of second derivative values first crosses zero; and
   output the selected value for the kernel parameter for identifying an outlier in a scoring dataset.

2. The non-transitory computer-readable medium of claim 1, wherein the objective function defined for the SVDD model is $\max(\sum_{i=1}^{n}\alpha_i K(x_i,x_i)-\sum_{i=1}^{n}\sum_{j=1}^{n}\alpha_i\alpha_j K(x_i,x_j))$, subject to $\sum_{i=1}^{n}\alpha_i=1$ and $0\leq\alpha_i\leq C$, $\forall i=1,\ldots,n$, where $K(x_i,x_j)$ is the kernel function, n is a number of data points of the read plurality of data points, $C=1/nf$ where f is an expected outlier fraction, $x_i$ are the read plurality of data points, $\alpha_i$ are Lagrange constants, and $\forall x_k \in SV_{<C}$, where $SV_{<C}$ is the set of support vectors that have $\alpha_k<C$.

3. The non-transitory computer-readable medium of claim 1, wherein the kernel function is a Gaussian kernel function, and the kernel parameter is a Gaussian bandwidth parameter.

4. The non-transitory computer-readable medium of claim 1, wherein the computer-readable instructions further cause the computing device to compute a threshold using the stored, defined set of support vectors associated with the selected value for the kernel parameter and the read plurality of data points.

5. The non-transitory computer-readable medium of claim 4, wherein the threshold is computed using $R^2=K(x_k,x_k)-2\Sigma_{i=1}^{n}\alpha_i K(x_i,x_k)+\Sigma_{i=1}^{n}\Sigma_{j=1}^{n}\alpha_i\alpha_j K(x_i,x_k)$, wherein the objective function defined for the SVDD model is max $(\Sigma_{i=1}^{n}\alpha_i K(x_i,x_i)-\Sigma_{i=1}^{n}\Sigma_{j=1}^{n}\alpha_i\alpha_j K(x_i,x_j))$, subject to $\Sigma_{i=1}^{n}\alpha_i=1$ and $0\leq\alpha_i\leq C$, $\forall i=1,\ldots,n$, where $K(x_i,x_j)$ is the kernel function, n is a number of data points of the read plurality of data points, $C=1/nf$ where f is an expected outlier fraction, $x_i$ are the read plurality of data points, $\alpha_i$ are Lagrange constants using any $x_k \in SV_{<C}$, where $SV_{<C}$ is the set of support vectors that have $0<\alpha_k<C$.

6. The non-transitory computer-readable medium of claim 4, wherein after outputting the selected value for the kernel parameter, the computer-readable instructions further cause the computing device to:
   read a second plurality of data points from a scoring dataset;
   select a first data point from the read second plurality of data points;
   compute a distance value using the stored, defined set of support vectors associated with the selected value for the kernel parameter and the selected first data point; and
   when the computed distance value is greater than the computed threshold, identify the selected first data point as an outlier.

7. The non-transitory computer-readable medium of claim 6, wherein the threshold is computed using $R^2=K(x_k,x_k)-2\Sigma_{i=1}^{n}\alpha_i K(x_i,x_k)+\Sigma_{i=1}^{n}\Sigma_{j=1}^{n}\alpha_i\alpha_j K(x_i,x_k)$, wherein the objective function defined for the SVDD model is max$(\Sigma_{i=1}^{n}\alpha_i K(x_i,x_i)-\Sigma_{i=1}^{n}\Sigma_{j=1}^{n}\alpha_i\alpha_j K(x_i,x_j))$, subject to $\Sigma_{i=1}^{n}\alpha_i=1$ and $0\leq\alpha_i\leq C$, $\forall i=1,\ldots,n$, where $K(x_i,x_j)$ is the kernel function, n is a number of data points of the read plurality of data points, $C=1/nf$ where f is an expected outlier fraction, $x_i$ are the read plurality of data points, $\alpha_i$ are Lagrange constants using any $x_k \in SV_{<C}$, where $SV_{<C}$ is the set of support vectors that have $0<\alpha_k<C$.

8. The non-transitory computer-readable medium of claim 7, wherein the distance value is computed using $\text{dist}^2(z)=K(z,z)-2\Sigma_{i=1}^{n}\alpha_i K(x_i,z)+\Sigma_{i=1}^{n}\Sigma_{j=1}^{n}\alpha_i\alpha_j K(x_i,x_1)$, where z is the selected first data point.

9. The non-transitory computer-readable medium of claim 6, wherein when the computed distance value is not greater than the computed threshold, the selected first data point is not identified as an outlier.

10. The non-transitory computer-readable medium of claim 9, wherein the computer-readable instructions further cause the computing device to:
   (a) select a next data point from the read second plurality of data points;
   (b) compute a second distance value using the stored, defined set of support vectors associated with the selected value for the kernel parameter and the selected next data point; and
   (c) when the computed second distance value is greater than the computed threshold, identify the selected next data point as an outlier; and
   repeat (a) to (c) until each data point of the read second plurality of data points is selected as the next data point.

11. The non-transitory computer-readable medium of claim 1, wherein after outputting the selected value for the kernel parameter, the computer-readable instructions further cause the computing device to:
   read a second plurality of data points from a scoring dataset;
   select a first data point from the read second plurality of data points;
   compute a distance value using the defined second set of support vectors and the selected first data point; and
   when the computed distance value is greater than a threshold computed based on the kernel function, identify the selected first data point as an outlier.

12. The non-transitory computer-readable medium of claim 1, wherein after computing the plurality of second derivative values, the computer-readable instructions further cause the computing device to fit a curve to the computed plurality of second derivative values, wherein when the computed second derivative crosses zero is determined using the fit curve.

13. The non-transitory computer-readable medium of claim 12, wherein the curve is fit to the computed plurality of second derivative values using a penalized B-spline curve fit function.

14. The non-transitory computer-readable medium of claim 12, wherein when the computed second derivative crosses zero is determined when a curve fit value first crosses zero within a confidence limit.

15. The non-transitory computer-readable medium of claim 14, wherein when the computed second derivative crosses zero is determined for a range of kernel parameter values while the curve fit value remains zero within the confidence limit.

16. The non-transitory computer-readable medium of claim 15, wherein the value selected for the kernel parameter is an average of the range of kernel parameter values.

17. A computing device comprising:
   a processor; and
   a non-transitory computer-readable medium operably coupled to the processor, the computer-readable medium having computer-readable instructions stored thereon that, when executed by the processor, cause the computing device to
   read a plurality of data points from a training dataset;
   select a plurality of values for a kernel parameter used by a kernel function;
   for each of the selected plurality of values for the kernel parameter, compute an optimal value of an objective function defined for a support vector data description (SVDD) model using the kernel function, the read plurality of data points, and a respective value for the kernel parameter to define a plurality of sets of support vectors, where each set of support vectors defines a boundary for the read plurality of data points in association with the respective value for the kernel parameter;
   for each of the selected plurality of values for the kernel parameter, store the computed optimal value and the defined set of support vectors in association with the respective value for the kernel parameter;
   compute a plurality of first derivative values for the objective function as a difference between the computed optimal values associated with successive values for the kernel parameter;
   compute a plurality of second derivative values for the objective function as a difference between the computed plurality of first derivative values associated with successive values for the kernel parameter;
   select a value for the kernel parameter where the computed plurality of second derivative values first crosses zero; and
   output the selected value for the kernel parameter for identifying an outlier in a scoring dataset.

18. The computing device of claim 17, wherein the kernel function is a Gaussian kernel function, and the kernel parameter is a Gaussian bandwidth parameter.

19. The computing device of claim 17, wherein the computer-readable instructions further cause the computing device to compute a threshold using the stored, defined set of support vectors associated with the selected value for the kernel parameter and the read plurality of data points.

20. The computing device of claim 17, wherein after computing the plurality of second derivative values, the computer-readable instructions further cause the computing device to fit a curve to the computed plurality of second derivative values, wherein when the computed second derivative crosses zero is determined using the fit curve.

21. The computing device of claim 20, wherein when the computed second derivative crosses zero is determined when a curve fit value first crosses zero within a confidence limit.

22. The computing device of claim 21, wherein when the computed second derivative crosses zero is determined for a range of kernel parameter values while the curve fit value remains zero within the confidence limit.

23. The computing device of claim 22, wherein the value selected for the kernel parameter is an average of the range of kernel parameter values.

24. A method of determining a support vector data description for outlier identification, the method comprising:
    reading, by a computing device, a plurality of data points from a training dataset;
    selecting, by the computing device, a plurality of values for a kernel parameter used by a kernel function;
    for each of the selected plurality of values for the kernel parameter, computing, by the computing device, an optimal value of an objective function defined for a support vector data description (SVDD) model using the kernel function, the read plurality of data points, and a respective value for the kernel parameter to define a plurality of sets of support vectors, where each set of support vectors defines a boundary for the read plurality of data points in association with the respective value for the kernel parameter;
    for each of the selected plurality of values for the kernel parameter, storing, by the computing device, the computed optimal value and the defined set of support vectors in association with the respective value for the kernel parameter;
    computing, by the computing device, a plurality of first derivative values for the objective function as a difference between the computed optimal values associated with successive values for the kernel parameter;
    computing, by the computing device, a plurality of second derivative values for the objective function as a difference between the computed plurality of first derivative values associated with successive values for the kernel parameter;
    selecting, by the computing device, a value for the kernel parameter where the computed plurality of second derivative values first crosses zero; and
    outputting, by the computing device, the selected value for the kernel parameter for identifying an outlier in a scoring dataset.

25. The method of claim 24, wherein the kernel function is a Gaussian kernel function, and the kernel parameter is a Gaussian bandwidth parameter.

26. The method of claim 24, further comprising computing, by the computing device, a threshold using the stored, defined set of support vectors associated with the selected value for the kernel parameter and the read plurality of data points.

27. The method of claim 24, further comprising, after computing the plurality of second derivative values, fitting, by the computing device, a curve to the computed plurality of second derivative values, wherein when the computed second derivative crosses zero is determined using the fit curve.

28. The method of claim 27, wherein when the computed second derivative crosses zero is determined when a curve fit value first crosses zero within a confidence limit.

29. The method of claim 28, wherein when the computed second derivative crosses zero is determined for a range of kernel parameter values while the curve fit value remains zero within the confidence limit.

30. The method of claim 29, wherein the value selected for the kernel parameter is an average of the range of kernel parameter values.

* * * * *

UNITED STATES PATENT AND TRADEMARK OFFICE
CERTIFICATE OF CORRECTION

PATENT NO. : 9,536,208 B1
APPLICATION NO. : 15/096552
DATED : January 3, 2017
INVENTOR(S) : Deovrat Vijay Kakde et al.

Page 1 of 2

It is certified that error appears in the above-identified patent and that said Letters Patent is hereby corrected as shown below:

In the Specification

Equation 2, Column 7, Line 25:
Delete "$\sum_{i=1}^{n} \alpha_i = 1$" and replace with -- $\sum_{i=1}^{n} \alpha_i = 1$, --

Column 7, Line 28:
Delete "$\alpha_i \in \mathbb{R};$" and replace with --$\alpha_i \in \mathbb{R}$:--

Equation 4, Column 7, Line 40:
Delete "$\sum_{i=1}^{n} \alpha_i x_i = a$" and replace with -- $\sum_{i=1}^{n} \alpha_i x_i = a$ --

Equation 5, Column 7, Line 42:
Delete "$\|x_i - \alpha\| l < R \rightarrow \alpha_i = 0$" and replace with --$\|x_i - a\| < R \rightarrow \alpha_i = 0$--

Equation 6, Column 7, Line 44:
Delete "$\|x_i - \alpha\| = R \rightarrow 0 < \alpha_i < C$" and replace with --$\|x_i - a\| = R \rightarrow 0 < \alpha_i < C$--

Equation 7, Column 7, Line 46:
Delete "$\|x_i - \alpha\| > R \rightarrow \alpha_i = C$" and replace with --$\|x_i - a\| > R \rightarrow \alpha_i = C$--

Column 7, Line 47:
Delete "where $\alpha$ is a center" and replace with --where $a$ is a center--

Equation 8, Column 7, Line 50:
Delete "$R^2 = (x_k \cdot x_k) - 2 \sum_{i=1}^{n} \alpha_i (x_i \cdot x_k) \sum_{i=1}^{n} \sum_{j=1}^{n} \alpha_i \alpha_j (x_i \cdot x_k))$" and replace with
-- $R^2 = (x_k \cdot x_k) - 2\sum_{i=1}^{n} \alpha_i(x_i \cdot x_k) + \sum_{i=1}^{n}\sum_{j=1}^{n} \alpha_i \alpha_j (x_i \cdot x_k)$ --

Signed and Sealed this
Twenty-first Day of March, 2017

Michelle K. Lee
*Director of the United States Patent and Trademark Office*

CERTIFICATE OF CORRECTION (continued)
U.S. Pat. No. 9,536,208 B1

Column 7, Line 51:
Delete "$x_k \in SV\_c$" and replace with --$x_k \in SV_{<C}$--

Column 7, Line 53:
Delete "$dist^2(z) = (z \cdot z) - 2\sum_{i=1}^{n} \alpha_i(x_i \cdot z) + \sum_{i=1}^{n}\sum_{j=1}^{n} \alpha_i \alpha_j(x_i \cdot x_j)$" and replace with
-- $dist^2(z) = (z \cdot z) - 2\sum_{i=1}^{n} \alpha_i(x_i \cdot z) + \sum_{i=1}^{n}\sum_{j=1}^{n} \alpha_i \alpha_j(x_i \cdot x_j)$ --

Equation 11, Column 8, Line 20:
Delete "$\sum_{i=1}^{n} \alpha_i = 1,$" and replace with -- $\sum_{i=1}^{n} \alpha_i = 1,$ --

Equation 13, Column 8, Line 29:
Delete "$R^2 = K(x_k, x_k) - 2\sum_{i=1}^{n} \alpha_i K(x_i, x_k) + \sum_{i=1}^{n}\sum_{j=1}^{n} \alpha_i \alpha_j K(x_i, x_k)$" and replace with
-- $R^2 = K(x_k, x_k) - 2\sum_{i=1}^{n} \alpha_i K(x_i, x_k) + \sum_{i=1}^{n}\sum_{j=1}^{n} \alpha_i \alpha_j K(x_i, x_k)$ --

Column 8, Lines 31-32:
Delete "$dist^2(z) = K(z, z) - 2\sum_{i=1}^{n} \alpha_i K(x_i, z) + \sum_{i=1}^{n}\sum_{j=1}^{n} \alpha_i \alpha_j K(x_i, x_j)$" and replace with
-- $dist^2(z) = K(z, z) - 2\sum_{i=1}^{n} \alpha_i K(x_i, z) + \sum_{i=1}^{n}\sum_{j=1}^{n} \alpha_i \alpha_j K(x_i, x_j)$ --

Column 8, Line 37:
Delete "$SV\_c$" and replace with --$SV_{<C}$--

Column 15, Line 39:
Delete "0.85 − 0.5/2 + 0.5 = 0.675 − 0.7" and replace with -- $\frac{(0.85-0.5)}{2} + 0.5 = 0.675 \sim 0.7$ --

Column 16, Lines 10-11:
Delete "$dist^2(z) = K(z, z) - 2\sum_{i=1}^{n} \alpha_i K(x_i, z) + \alpha_i \alpha_j K(x_i, x_j)$" and replace with
-- $dist^2(z) = K(z, z) - 2\sum_{i=1}^{n} \alpha_i K(x_i, z) + \sum_{i=1}^{n}\sum_{j=1}^{n} \alpha_i \alpha_j K(x_i, x_j)$ --

Column 16, Line 16:
Delete "$dist^2(z) < R^2$" and replace with --$dist^2(z) \leq R^2$--